US012614831B2

(12) United States Patent
Miyazaki et al.

(10) Patent No.: US 12,614,831 B2
(45) Date of Patent: Apr. 28, 2026

(54) DIRECTIONAL COUPLER, HIGH FREQUENCY MODULE, AND COMMUNICATION APPARATUS

(71) Applicant: Murata Manufacturing Co., Ltd., Kyoto (JP)

(72) Inventors: Yuuta Miyazaki, Kyoto (JP); Koji Furutani, Kyoto (JP); Naoya Akashi, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 165 days.

(21) Appl. No.: 18/481,373

(22) Filed: Oct. 5, 2023

(65) Prior Publication Data

US 2024/0128629 A1 Apr. 18, 2024

(30) Foreign Application Priority Data

Oct. 14, 2022 (JP) ................................ 2022-165876

(51) Int. Cl.
*H01P 5/18* (2006.01)
*H01P 1/18* (2006.01)

(52) U.S. Cl.
CPC .............. *H01P 5/184* (2013.01); *H01P 1/184* (2013.01)

(58) Field of Classification Search
CPC .......... H01P 5/184; H01P 1/184; H01P 5/187; H01P 5/18; H01P 1/10; H01P 1/18
See application file for complete search history.

(56) References Cited

U.S. PATENT DOCUMENTS 9,893,408 B2 * 2/2018 Ashida ................ H03H 7/0115
10,084,225 B2 * 9/2018 Ashida .................... H01P 5/187
2005/0251598 A1 11/2005 Osaka
2015/0236666 A1 * 8/2015 Ootsuka ................. H01P 5/185 333/112
2018/0062237 A1 3/2018 Oohashi
2020/0021003 A1 * 1/2020 Kim .................. H01R 13/6625
2021/0036396 A1 2/2021 Seki et al.
2021/0376441 A1 * 12/2021 Tokuda .................... H03H 7/06
2024/0347890 A1 * 10/2024 Seki ......................... H01P 5/18

FOREIGN PATENT DOCUMENTS

JP 4451776 B2 4/2010
JP 4782562 B2 9/2011
JP 6358297 B2 7/2018
JP 2021-027426 A 2/2021

* cited by examiner

*Primary Examiner* — John W Poos

(74) *Attorney, Agent, or Firm* — McDonald Hopkins LLC

(57) ABSTRACT

A directional coupler includes a main line, a first sub-line, a second sub-line, a first phase shift circuit, a first short-circuit path, and a first short-circuit switch. The first phase shift circuit is connected between the first sub-line and the second sub-line. The first short-circuit path short-circuits both ends of the first phase shift circuit. The first short-circuit switch switches between conduction and non-conduction of the first short-circuit path.

16 Claims, 18 Drawing Sheets

DIRECTIONAL COUPLER, HIGH FREQUENCY MODULE, AND COMMUNICATION APPARATUS

CROSS REFERENCE TO RELATED APPLICATION

This application claims priority from Japanese Patent Application No. 2022-165876 filed on Oct. 14, 2022. The content of this application is incorporated herein by reference in its entirety.

BACKGROUND OF THE DISCLOSURE

1. Field of the Disclosure

The present disclosure relates to a directional coupler, a high frequency module, and a communication apparatus.

2. Description of the Related Art

A directional coupler described in Japanese Unexamined Patent Application Publication No. 2021-27426 includes a main line, two sub-lines (first and second sub-lines), and a switch circuit (a first selector switch and a second selector switch). In this directional coupler, in the case where a first signal of a high frequency band flowing in the main line is extracted from a sub-line, a first sub-line or a second sub-line is used as the sub-line. Furthermore, in the case where a second signal of a low frequency band flowing in the main line is extracted from a sub-line, a sub-line including the first sub-line and the second sub-line that are connected in series is used as the sub-line.

BRIEF SUMMARY OF THE DISCLOSURE

In the directional coupler described in Japanese Unexamined Patent Application Publication No. 2021-27426, in the case where the first signal and the second signal flow at the same time in the main line, when the second signal (detection target signal) flowing in the main line is extracted from a sub-line, part of the first signal (non-detection target signal) flowing in the main line may leak into the sub-line. Furthermore, it is desirable that the directional coupler reduce the loss in signals flowing in the main line.

In view of the problem mentioned above, it is a possible benefit of the present disclosure to provide a directional coupler, a high frequency module, and a communication apparatus capable of reducing the loss in signals flowing in a main line and suppressing, when a detection target signal flowing in the main line is detected, the leakage of a non-detection target signal, which flows in the main line concurrently with the detection target signal, into the sub-line.

A directional coupler according to an aspect of the present disclosure includes a main line, a first sub-line, a second sub-line, a first phase shift circuit, a first short-circuit path, and a first short-circuit switch. The first phase shift circuit is connected between the first sub-line and the second sub-line. The first short-circuit path short-circuits both ends of the first phase shift circuit. The first short-circuit switch switches between conduction and non-conduction of the first short-circuit path.

A high frequency module according to an aspect of the present disclosure includes the directional coupler, an antenna terminal, a plurality of filters, and an antenna switch. The antenna switch switches between connection and disconnection between a signal path reaching the antenna terminal and the plurality of filters. The main line of the directional coupler configures a section of the signal path.

A communication apparatus according to an aspect of the present disclosure includes the high frequency module and a signal processing circuit. The signal processing circuit is connected to the high frequency module and performs signal processing for a high frequency signal.

With a directional coupler, a high frequency module, and a communication apparatus according to the present disclosure, advantages of reducing the loss in signals flowing in a main line and suppressing, when a detection target signal flowing in the main line is detected, the leakage of a non-detection target signal, which flows in the main line concurrently with the detection target signal, into the sub-line, can be achieved.

BRIEF DESCRIPTION OF THE SEVERAL VIEWS OF THE DRAWINGS

FIG. 17 is a plan view obtained when part of the inside of an IC chip of the directional coupler is seen through;

DETAILED DESCRIPTION OF THE DISCLOSURE

Figure 1:
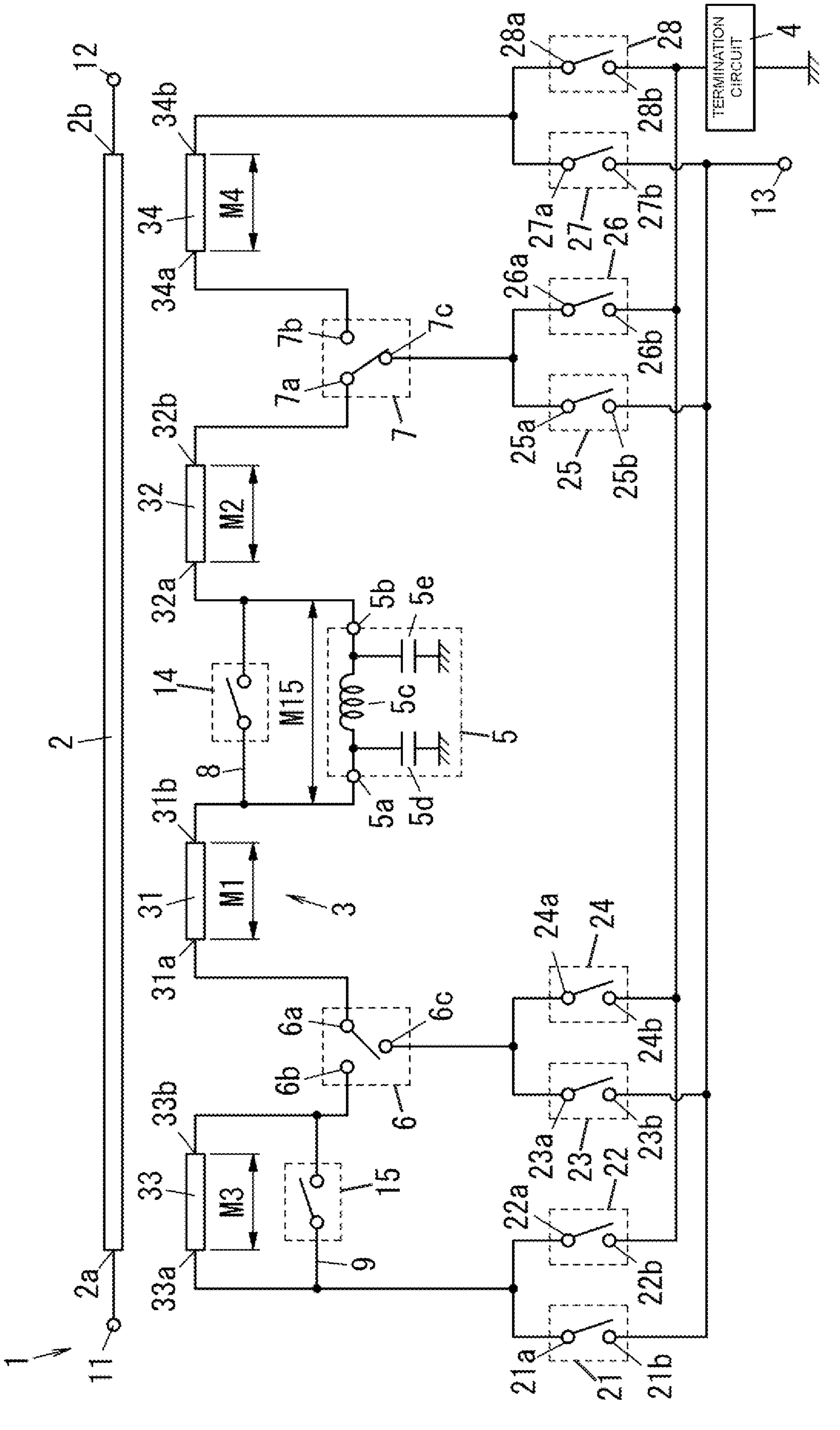
FIG. 1 is a circuit diagram of a directional coupler according to a first embodiment.

A directional coupler, a high frequency module, and a communication apparatus according to embodiments will be described below with reference to the drawings. Regarding component elements described herein and illustrated in the drawings, sizes, thicknesses, and dimensional relationships described herein and illustrated in the drawings are examples, and these component elements are not limited to the examples described herein and illustrated in the drawings.

First Embodiment

1 Configuration of Directional Coupler

A configuration of a directional coupler 1 according to a first embodiment will be described with reference to FIG. 1.

The directional coupler 1 is used, for example, for a high frequency module of a communication apparatus. As illustrated in FIG. 1, the directional coupler 1 is a device that extracts, as a detection signal, part of high frequency signals flowing in a section (main line 2) of a signal path inside the high frequency module, from a sub-line 3 that is electromagnetically coupled to the main line 2. Monitoring a high frequency signal flowing in the main line 2 is achieved by monitoring a detection signal. The directional coupler 1 according to the first embodiment is configured to be capable of changing the line length of the sub-line 3 in multiple stages (for example, three stages) so that signals of a plurality of frequency bands can be supported. In addition, the directional coupler 1 according to the first embodiment is configured to be capable of reducing the loss in signals flowing in the main line 2 and suppressing, when a detection target signal flowing in the main line 2 is detected, the leakage of a non-detection target signal, which flows in the main line 2 concurrently with the detection target signal, into the sub-line 3. The directional coupler 1 will be described in detail below.

As illustrated in FIG. 1, the directional coupler 1 includes the main line 2, the sub-line 3, a termination circuit 4, a phase shift circuit 5 (first phase shift circuit), a first selector switch 6, a second selector switch 7, a first short-circuit path 8, a second short-circuit path 9, a first short-circuit switch 14, and a second short-circuit switch 15. The directional coupler 1 also includes first to third connection terminals 11 to 13 and first to eighth switches 21 to 28.

The first to third connection terminals 11 to 13 are terminals capable of being connected to an external circuit (not illustrated in the drawings). The first connection terminal 11 and the second connection terminal 12 function as input/output terminals that input signals to the main line 2 and output signals from the main line 2. The third connection terminal 13 functions as an output terminal that outputs a detection signal extracted from the sub-line 3.

The main line 2 is a line in which a high frequency signal as a detection target flows. The main line 2 has a first end 2*a* and a second end 2*b*, which are both ends of the main line 2 in a longitudinal direction. The first end 2*a* of the main line 2 is connected to the first connection terminal 11. The second end 2*b* of the main line 2 is connected to the second connection terminal 12.

The sub-line 3 is a line that is electromagnetically coupled to the main line 2 and extracts, as a detection signal, part of high frequency signals flowing in the main line 2 as a detection signal. The sub-line 3 includes a first sub-line 31, a second sub-line 32, a third sub-line 33, and a fourth sub-line 34.

The first sub-line 31 has a first end 31*a* and a second end 31*b*, which are both ends of the first sub-line 31 in the longitudinal direction. The first end 31*a* of the first sub-line 31 is connected to a common terminal 6*a*, which will be described later, of the first selector switch 6. The second end 31*b* of the first sub-line 31 is connected to a first end 5*a*, which will be described later, of the phase shift circuit 5. The first sub-line 31 is electromagnetically coupled to the main line 2.

The second sub-line 32 has a first end 32*a* and a second end 32*b*, which are both ends of the second sub-line 32 in the longitudinal direction. The first end 32*a* of the second sub-line 32 is connected to a second end 5*b*, which will be described later, of the phase shift circuit 5. The second end 32*b* of the second sub-line 32 is connected to a selection terminal 7*a*, which will be described later, of the second selector switch 7. The second sub-line 32 is electromagnetically coupled to the main line 2.

The third sub-line 33 has a first end 33*a* and a second end 33*b*, which are both ends of the third sub-line 33 in the longitudinal direction. The first end 33*a* of the third sub-line 33 is connected to a first terminal 21*a*, which will be described later, of the first switch 21 and a first terminal 22*a*, which will be described later, of the second switch 22. The second end 33*b* of the third sub-line 33 is connected to a selection terminal 6*b*, which will be described later, of the first selector switch 6. The third sub-line 33 is electromagnetically coupled to the main line 2.

The fourth sub-line 34 has a first end 34*a* and a second end 34*b*, which are both ends of the fourth sub-line 34 in the longitudinal direction. The first end 34*a* of the fourth sub-line 34 is connected to a selection terminal 7*b*, which will be described later, of the second selector switch 7. The second end 34*b* of the fourth sub-line 34 is connected to a first terminal 27*a*, which will be described later, of the seventh switch 27 and a first terminal 28*a* of the eighth switch 28. The fourth sub-line 34 is electromagnetically coupled to the main line 2.

The first sub-line 31, the second sub-line 32, the third sub-line 33, and the fourth sub-line 34 are arranged along the longitudinal direction of the main line 2. A line length M1 of the first sub-line 31 and a length M2 of the second sub-line 32 are the same length. Furthermore, a line length M3 of the third sub-line 33 and a line length M4 of the fourth sub-line 34 may be the same as the line length M1 of the first sub-line 31 and the line length M2 of the second sub-line 32 or may be different from the line length M1 of the first sub-line 31 and the line length M2 of the second sub-line 32. The line length M3 of the third sub-line 33 is longer than the line length M4 of the fourth sub-line 34. However, the line length M3 of the third sub-line 33 may be shorter than the line length M4 of the fourth sub-line 34, or the line length M3 of the third sub-line 33 and the line length M4 of the fourth sub-line 34 may be the same length.

The directional coupler 1 has four modes (first to fourth modes). In the first mode, the sub-line 3 including the first sub-line 31, the second sub-line 32, the third sub-line 33, and the fourth sub-line 34, and the phase shift circuit 5 are used. In the second mode, the sub-line 3 including the first sub-line 31 and the second sub-line 32, and the phase shift circuit 5 are used. In the third mode and the fourth mode, the sub-line 3 including the fourth sub-line 34 is used.

The termination circuit 4 is a circuit for terminating one of the both ends of the sub-line 3 used in each of the first to fourth modes. More particularly, in the first mode, the termination circuit 4 terminates one of the first end 33*a* of the third sub-line 33 and the second end 34*b* of the fourth sub-line 34 in a series circuit described above. Furthermore, in the second mode, the termination circuit 4 terminates one of the first end 31*a* of the first sub-line 31 and the second end 32*b* of the second sub-line 32 in a series circuit described above. Furthermore, in the third mode and the fourth mode, the termination circuit 4 terminates one of the first end 34*a* and the second end 34*b* of the fourth sub-line 34.

The phase shift circuit 5 is a circuit that is connected between the first sub-line 31 and the second sub-line 32 that are used as the sub-line 3 in the first mode and the second mode and adjusts the frequency band of a signal that can flow in the sub-line 3. The phase shift circuit 5 adjusts the frequency band of a signal that can flow in the sub-line 3 in the first mode and the second mode, so that leakage of a non-detection target signal (for example, a signal of a relatively high frequency band) into the sub-line 3 from the main line 2 can be suppressed. The phase shift circuit 5 is provided at a signal path between the first end 31*a* of the first sub-line 31 and the second end 32*b* of the second sub-line 32. That is, the phase shift circuit 5 is connected between the first sub-line 31 and the second sub-line 32. More particularly, the phase shift circuit 5 has the first end 5*a* and the second end 5*b*. The first end 5*a* of the phase shift circuit 5 is connected to the second end 31*b* of the first sub-line 31, and the second end 5*b* of the phase shift circuit 5 is connected to the first end 32*a* of the second sub-line 32.

The phase shift circuit 5 includes, for example, an inductor 5*c* and two capacitors 5*d* and 5*e*. The phase shift circuit 5 includes a low pass filter including the inductor 5*c* and the two capacitors 5*d* and 5*e*. The inductor 5*c* is connected between both ends (first end 5*a* and second end 5*b*) of the phase shift circuit 5. The capacitor 5*d* is connected between a connection point between the first end 5*a* of the phase shift circuit 5 and the inductor 5*c* and the ground. The capacitor 5*e* is connected between a connection point between the second end 5*b* of the phase shift circuit 5 and the inductor 5*c* and the ground.

The first selector switch 6 is provided between the first end 31*a* of the first sub-line 31 and the second end 33*b* of the third sub-line 33 and switches between connection and disconnection between the first end 31*a* of the first sub-line 31 and the second end 33*b* of the third sub-line 33 in accordance with the first to fourth modes. More particularly, the first selector switch 6 connects the first end 31*a* of the first sub-line 31 to one of the second end 33*b* of the third sub-line 33, a first terminal 23*a* of the third switch 23, and a first terminal 24*a* of the fourth switch 24 in accordance with the first to fourth modes.

The first selector switch 6 includes the common terminal 6*a* and a plurality of (in the example illustrated in the drawing, two) selection terminals 6*b* and 6*c*. The common terminal 6*a* is connected to the first end 31*a* of the first sub-line 31. The selection terminal 6*b* is connected to the second end 33*b* of the third sub-line 33. The selection terminal 6*c* is connected to the third connection terminal 13 with the third switch 23 interposed therebetween and connected to the termination circuit 4 with the fourth switch 24 interposed therebetween.

The second selector switch 7 is provided between the second end 32*b* of the second sub-line 32 and the first end 34*a* of the fourth sub-line 34 and switches between connection and disconnection between the second end 32*b* of the second sub-line 32 and the first end 34*a* of the fourth sub-line 34 in accordance with the first to fourth modes. More particularly, the second selector switch 7 selectively connects two of the second end 32*b* of the second sub-line 32, the first end 34*a* of the fourth sub-line 34, a first end 25*a* of the fifth switch 25, and a first end 26*a* of the sixth switch 26 in accordance with the first to fourth modes. That is, the second selector switch 7 connects the second end 32*b* of the second sub-line 32 with the first end 34*a* of the fourth sub-line 34, connects the second end 32*b* of the second sub-line 32 with the first end 25*a* of the fifth switch 25 and the first end 26*a* of the sixth switch 26, or connects the first end 34*a* of the fourth sub-line 34 with the first end 25*a* of the fifth switch 25 and the first end 26*a* of the sixth switch 26.

The second selector switch 7 includes three selection terminals 7*a*, 7*b*, and 7*c*. Two of the three selection terminals 7*a*, 7*b*, and 7*c* are selectively connected. The selection terminal 7*a* is connected to the second end 32*b* of the second sub-line 32. The selection terminal 7*b* is connected to the first end 34*a* of the fourth sub-line 34. The selection terminal 7*c* is connected to the first end 25*a* of the fifth switch 25 and the first end 26*a* of the sixth switch 26. The second selector switch 7 may include a combination of single-pole single-throw (SPST) switches each including a common terminal and a selection terminal.

The first short-circuit path 8 is a wiring path for short-circuiting between both ends (first end 5*a* and second end 5*b*) of the phase shift circuit 5. The inductance of the first short-circuit path 8 is, for example, smaller than the inductance of the phase shift circuit 5. The inductance of the first short-circuit path 8 is, for example, smaller than the inductance of the first sub-line 31 and the inductance of the second sub-line 32. A line length M15 of the first short-circuit path 8 is, for example, shorter than the line length M1 of the first sub-line 31 and the line length M2 of the second sub-line 32.

The first short-circuit switch 14 makes the first short-circuit path 8 conductive and non-conductive in accordance with the first to fourth modes. The first short-circuit switch 14 makes the first short-circuit path 8 non-conductive so that the first short-circuit path 8 is disabled. Furthermore, the first short-circuit switch 14 makes the first short-circuit path 8 conductive so that an inductor component of the first short-circuit path 8 is connected in parallel with the inductor of the phase shift circuit 5. Accordingly, the inductor of a parallel circuit in which the phase shift circuit 5 and the first short-circuit path 8 are connected in parallel is smaller than the inductor of the phase shift circuit 5 alone. In the directional coupler 1, a resonance circuit is configured with a parasitic capacitance between the main line 2 and the sub-line 3 and the inductor of the parallel circuit mentioned above. As described above, since the inductor of the parallel circuit is smaller than the inductor of the phase shift circuit 5 alone, the resonant frequency of the resonance circuit is higher than the frequency band of a signal detected by the directional coupler 1. As a result, the resonant frequency of the resonance circuit is higher than the frequency band of a signal flowing in the main line 2, and a situation in which the resonant frequency of the resonance circuit causes the loss in signals flowing in the main line 2 can be suppressed.

The first short-circuit switch 14 is provided between both ends of the first short-circuit path 8. However, the first short-circuit switch 14 may be provided at one end of the first short-circuit path 8 or may be provided at each of the both ends of the first short-circuit path 8.

The second short-circuit path 9 is a wiring path for short-circuiting between both ends (first end 33*a* and second end 33*b*) of the third sub-line 33.

The second short-circuit switch 15 makes the second short-circuit path 9 conductive and non-conductive in accordance with the first to fourth modes. The second short-circuit switch 15 makes the second short-circuit path 9 non-conductive so that both ends of the third sub-line 33 are not short-circuited by the second short-circuit path 9. Furthermore, the second short-circuit switch 15 makes the second short-circuit path 9 conductive so that both ends of the are short-circuited by the second short-circuit path 9. In the first embodiment, as described later, in the fourth mode, the second short-circuit switch 15 is made conductive so that both ends of the third sub-line 33 are short-circuited. Thus, fine adjustment is made in such a manner that characteristics of return loss in the sub-line 3 (fourth sub-line 34 alone) used in the fourth mode are advantageous in a higher frequency band. Therefore, as described later, the sub-line 3 composed of the fourth sub-line 34 alone can be used in two modes (third mode and fourth mode) corresponding to different frequency bands, according to whether or not both ends of the third sub-line 33 that is not used are short-circuited.

The first to eighth switches 21 to 28 are switches for connecting one of the both ends of the sub-line 3 used in each of the modes (first to fourth modes) to the first connection terminal 11 and the other one of the both ends of the sub-line 3 to the termination circuit 4. More particularly, the first to eighth switches 21 to 28 switch between connection and disconnection in such a manner that one end of the sub-line 3 used in each mode that is in the same direction as the direction in which a detection target signal flows in the main line 2 is connected to the termination circuit 4 and one end of the sub-line 3 that is in the direction opposite the direction in which the detection target signal flows in the main line 2 is connected to the third connection terminal 13.

Each of the first to eighth switches 21 to 28 includes two terminals (first terminal and second terminal) capable of switching between connection and disconnection. The first terminal 21*a* of the first switch 21 and the first terminal 22*a* of the second switch are connected to the first end 33*a* of the third sub-line 33. The first terminal 23*a* of the third switch 23 and the first terminal 24*a* of the fourth switch are connected to the selection terminal 6*c* of the first selector switch 6. The first end 25*a* of the fifth switch 25 and the first end 26*a* of the sixth switch 26 are connected to the selection terminal 7*c* of the second selector switch 7. The first terminal 27*a* of the seventh switch 27 and the first terminal 28*a* of the eighth switch 28 are connected to the second end 34*b* of the fourth sub-line 34. The second terminals 21*b*, 23*b*, 25*b*, and 27*b* of the first switch 21, the third switch 23, the fifth switch 25, and the seventh switch 27, respectively, are connected to the third connection terminal 13. The second terminals 22*b*, 24*b*, 26*b*, and 28*b* of the second switch 22, the fourth switch 24, the sixth switch 26, and the eighth switch 28, respectively, are connected to the termination circuit 4.

The directional coupler 1 has the first mode, the second mode, the third mode, and the fourth mode, as described above. The first mode is a mode in which a signal of a first frequency band among high frequency signals flowing in the main line 2 is detected. The second mode is a mode in which a signal of a second frequency band among high frequency signals flowing in the main line 2 is detected. The third mode is a mode in which a signal of a third frequency band among high frequency signals flowing in the main line 2 is detected. The fourth mode is a mode in which a signal of a fourth frequency band among high frequency signals flowing in the main line 2 is detected.

The first frequency band corresponds to, for example, a frequency band from 617 MHz to 960 MHz (that is, a low band (LB)). Hereinafter, the first mode may be described as an LB mode. The second frequency band corresponds to, for example, a frequency band from 1.427 GHz to 2.69 GHz (that is, a middle band (MB) to a high band (HB)). Hereinafter, the second mode may be described as an MB-HB mode. The third frequency band corresponds to, for example, a frequency band from 3.3 GHz to 4.2 GHz (that is, an ultra-high band (UHB)). Hereinafter, the third mode may be described as a UHB1 mode. The fourth frequency band corresponds to, for example, a frequency band from 4.4 GHz to 5.0 GHz (that is, an ultra-high band (UHB)). Hereinafter, the fourth mode may be described as a UHB2 mode.

2 Operation 2.1 First Mode

Figure 2:
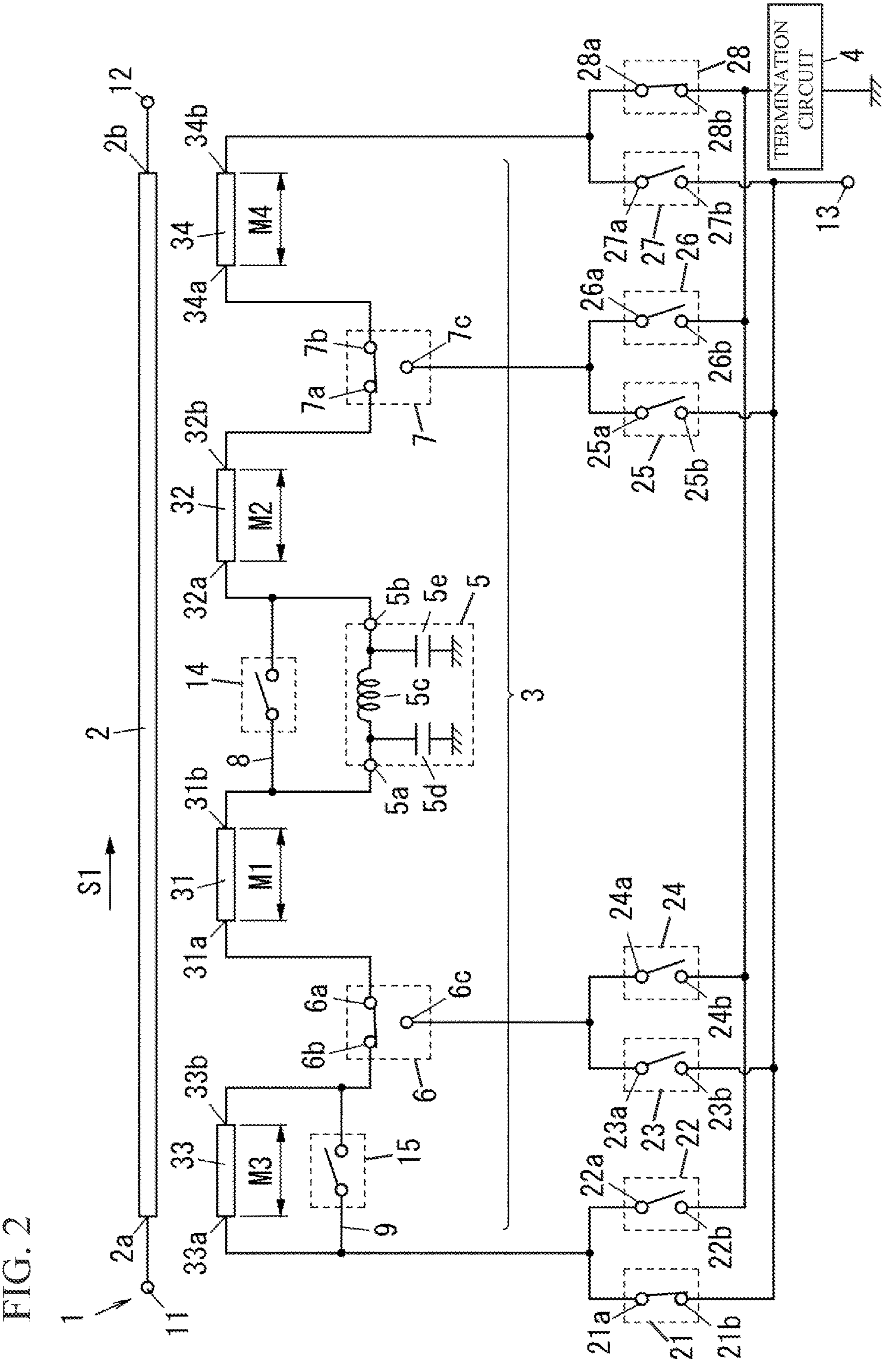
FIG. 2 is a circuit diagram for explaining a first mode of the directional coupler.

The first mode will be described with reference to FIG. 2. In the first mode, the directional coupler 1 uses the sub-line 3 including the first sub-line 31, the second sub-line 32, the third sub-line 33, and the fourth sub-line 34, and the phase shift circuit 5. Thus, the first selector switch 6 connects the common terminal 6*a* with the selection terminal 6*b*, the second selector switch 7 connects the selection terminal 7*a* with the selection terminal 7*b*, and both the first short-circuit switch 14 and the second short-circuit switch 15 are made non-conductive.

The sub-line 3 used in the first mode has the longest line length among the sub-lines 3 used in the first to fourth modes. Thus, the sub-line 3 used in the first mode is capable of detecting a signal of a relatively low frequency band (for example, the first frequency band). Since the frequency band of a signal that can flow in the sub-line 3 used in the first mode is adjusted by the phase shift circuit 5, a signal of a relatively high frequency band is difficult to flow in the sub-line 3 used in the first mode.

In the first mode, in the case where a forward signal S1 flowing in the main line 2 (a signal flowing from the first connection terminal 11 to the second connection terminal 12) is detected (see FIG. 2), the first switch 21 is made conductive so that the first end 33*a* of the third sub-line 33 is connected to the third connection terminal 13, and the eighth switch 28 is made conductive so that the second end 34*b* of the fourth sub-line 34 is connected to the termination circuit 4. The remaining switches (second to seventh switches 22 to 27) are made non-conductive.

In the first mode, in case where a backward signal flowing in the main line 2 (a signal flowing from the second connection terminal 12 to the first connection terminal 11) is detected (illustration is omitted), the second switch 22 is made conductive so that the first end 33*a* of the third sub-line 33 is connected to the termination circuit 4, and the seventh switch 27 is made conductive so that the second end 34*b* of the fourth sub-line 34 is connected to the third connection terminal 13. The remaining switches (first switch 21, third to sixth switches 23 to 26, and eighth switch 28) are made non-conductive.

In the first mode, the directional coupler 1 extracts, as a detection signal, part of a signal of the first frequency band (detection target signal) out of high frequency signals flowing in the main line 2 from the sub-line 3, and outputs the detection signal from the third connection terminal 13 to an external device (for example, a detector). In the first mode, the frequency band of a signal that can flow in the sub-line 3 used in the first mode is adjusted by the phase shift circuit 5. Thus, flowing of signals (non-detection target signals) of frequency bands (third frequency band and fourth frequency band) higher than the first frequency band into the sub-line 3 can be suppressed. Consequently, the leakage of non-detection target signals (signals of the third frequency band and the fourth frequency band) other than the detection target signal, out of the high frequency signals flowing in the main line 2, into the sub-line 3 can be suppressed.

2.2 Second mode

Figure 3:
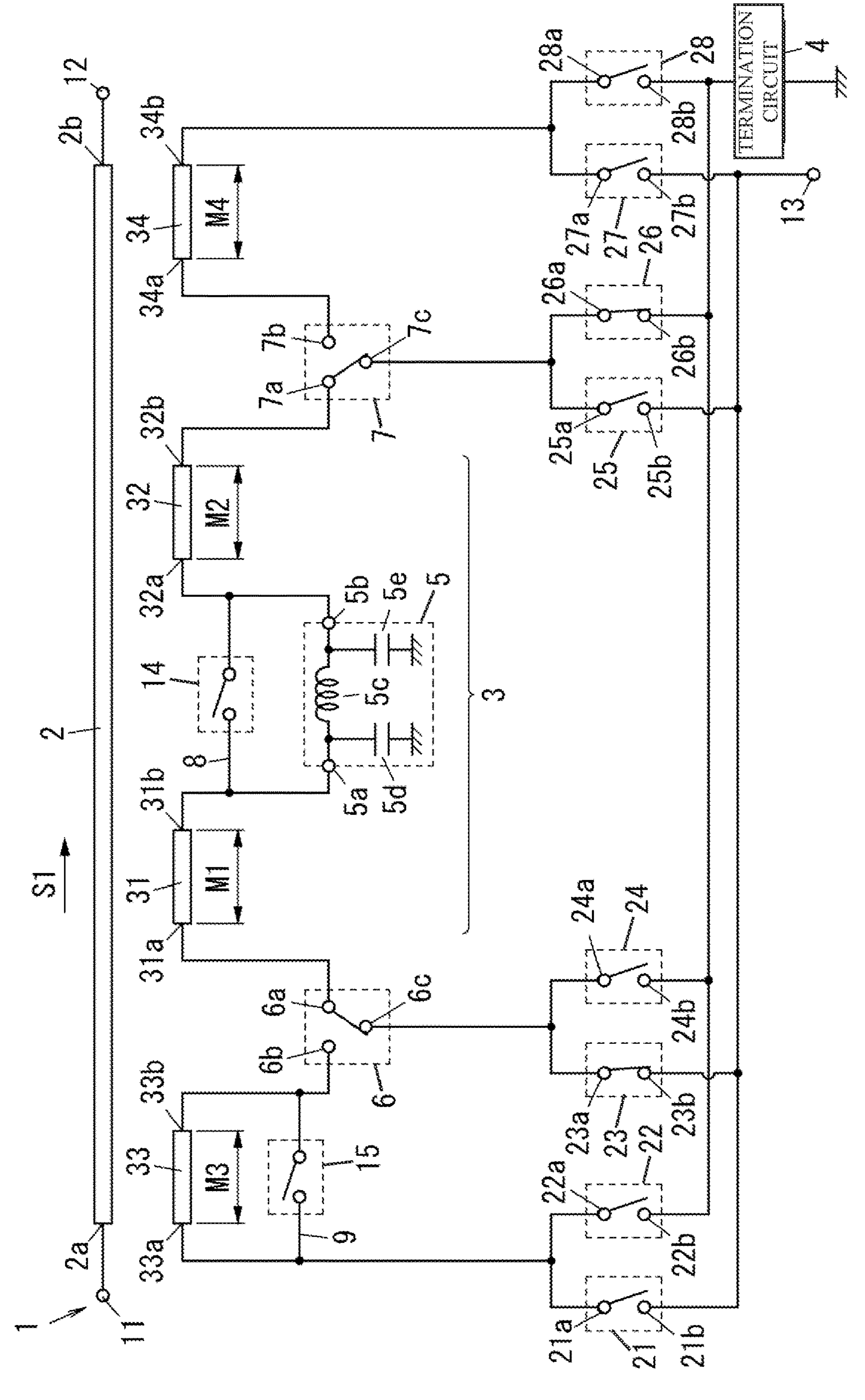
FIG. 3 is a circuit diagram for explaining a second mode of the directional coupler.

The second mode will be described with reference to FIG. 3. In the second mode, the directional coupler 1 uses the sub-line 3 including the first sub-line 31 and the second sub-line 32, and the phase shift circuit 5. Thus, the first selector switch 6 connects the common terminal 6*a* with the selection terminal 6*c*, the second selector switch 7 connects the selection terminal 7*a* with the selection terminal 7*c*, and both the first short-circuit switch 14 and the second short-circuit switch 15 are made non-conductive.

The sub-line 3 used in the second mode has a medium length among the sub-lines 3 used in the first to fourth modes. Thus, the sub-line 3 used in the second mode is capable of detecting a signal of a middle frequency band (for example, the second frequency band) among frequency bands detected in the first to fourth modes. Since the frequency band of a signal that can flow in the sub-line 3 used in the second mode is adjusted by the phase shift circuit 5, a signal of a relatively high frequency band is difficult to flow in the sub-line 3 used in the second mode. Since the line length of the sub-line 3 used in the second mode is a medium length, a signal of a relatively low frequency band (for example, the first frequency band) does not flow in the sub-line 3 used in the second mode.

In the second mode, in the case where the forward signal S1 flowing in the main line 2 is detected (see FIG. 3), the third switch 23 is made conductive so that the first end 31*a* of the first sub-line 31 is connected to the third connection terminal 13, and the sixth switch 26 is made conductive so that the second end 32*b* of the second sub-line 32 is connected to the termination circuit 4. The remaining switches (first, second, fourth, fifth, seventh, and eighth switches 21, 22, 24, 25, 27, and 28) are made non-conductive.

In the second mode, in the case where a backward signal flowing in the main line 2 is detected (illustration is omitted), the fourth switch 24 is made conductive so that the first end 31*a* of the first sub-line 31 is connected to the termination circuit 4, and the fifth switch 25 is made conductive so that the second end 32*b* of the second sub-line 32 is connected to the third connection terminal 13. The remaining switches (first to third switches 21 to 23 and sixth to eighth switches 26 to 28) are made non-conductive.

In the second mode, the directional coupler 1 extracts, as a detection signal, part of a signal of the second frequency band (detection target signal) out of high frequency signals flowing in the main line 2 from the sub-line 3, and outputs the detection signal from the third connection terminal 13 to an external device (for example, a detector). In the second mode, the frequency band of a signal that can flow in the sub-line 3 is adjusted by the phase shift circuit 5. Thus, flowing of signals (non-detection target signals) of frequency bands (third frequency band and fourth frequency band) higher than the second frequency band into the sub-line 3 can be suppressed. Consequently, the leakage of non-detection target signals (signals of the third frequency band and the fourth frequency band) other than the detection target signal, out of the high frequency signals flowing in the main line 2, into the sub-line 3 can be suppressed.

2.3 Third Mode

Figure 4:
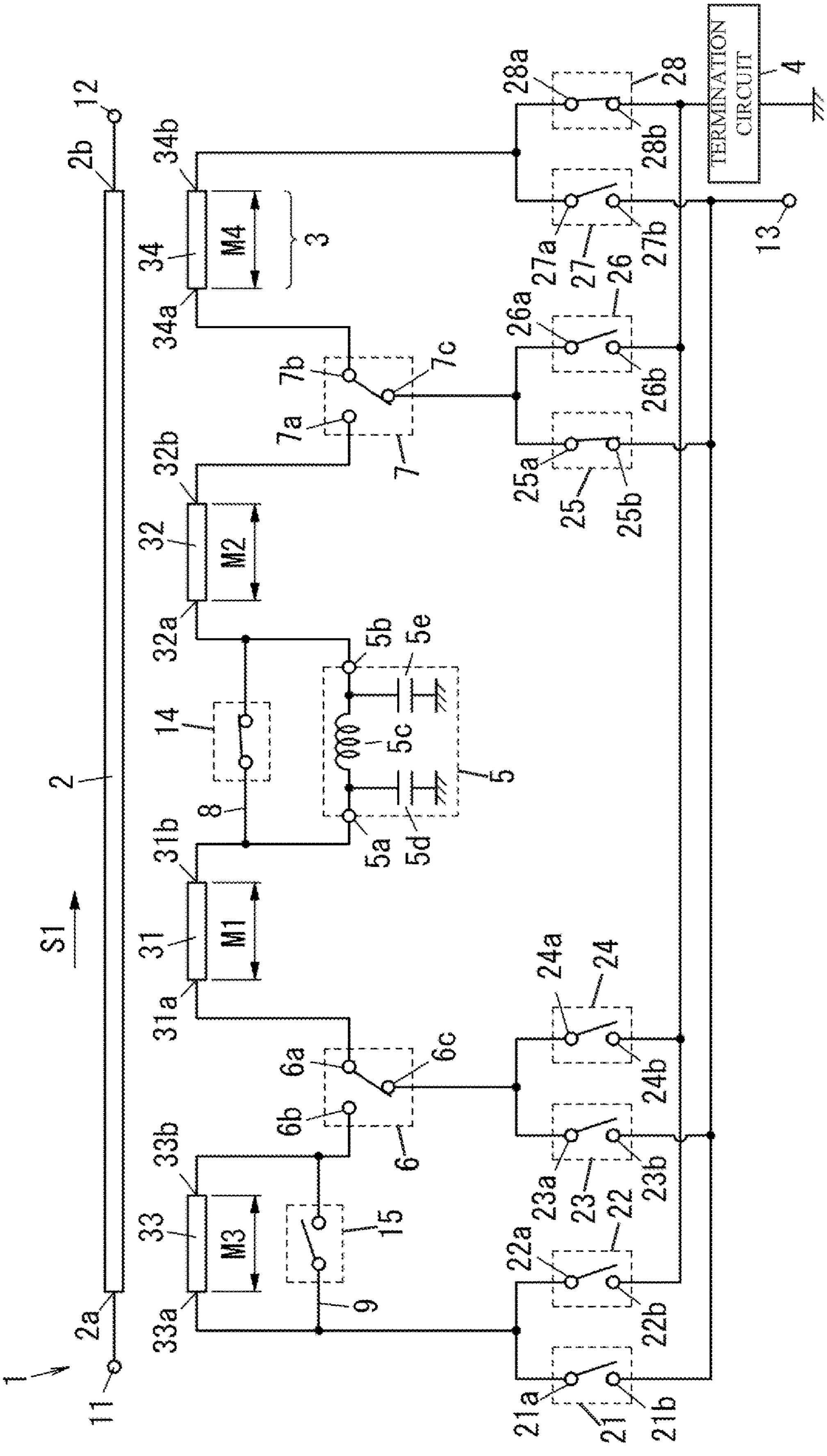
FIG. 4 is a circuit diagram for explaining a third mode of the directional coupler.

A third mode will be described with reference to FIG. 4. In the third mode, the directional coupler 1 uses the sub-line 3 including the fourth sub-line 34. Thus, the second selector switch 7 connects the selection terminal 7*b* with the selection terminal 7*c*. Furthermore, for example, the first selector switch 6 connects the common terminal 6*a* with the selection terminal 6*c*. The first selector switch 6 does not necessarily connect the common terminal 6*a* to both the selection terminals 6*b* and 6*c*. Furthermore, in the third mode, the first short-circuit switch 14 is made conductive. Furthermore, the second short-circuit switch 15 is made non-conductive.

The sub-line 3 used in the third mode has the shortest line length among the sub-lines 3 used in the first to fourth modes. Thus, the sub-line 3 used in the third mode is capable of detecting signals of relatively high frequency bands (for example, the third frequency band and the fourth frequency band). A signal of a relatively low frequency band is not detected in the sub-line 3 used in the third mode.

As described above, by making the second short-circuit switch 15 non-conductive and thus disabling the short circuit of the third sub-line 33 by the second short-circuit path 9, the frequency band of a signal that can flow in the sub-line 3 used is adjusted. Thus, only a signal of the third frequency band, out of the third frequency band and the fourth frequency band, can be detected in the sub-line 3 used in the third mode.

Furthermore, as described above, by making the first short-circuit switch 14 conductive, the first short-circuit path 8 is connected in parallel with the phase shift circuit. Thus, the inductor component of the first short-circuit path 8 is connected in parallel with the inductor 5*c* of the phase shift circuit 5. Therefore, the inductance of the parallel circuit including the phase shift circuit 5 and the first short-circuit path 8 is smaller than the inductance of the phase shift circuit 5. In the directional coupler 1, the resonance circuit is configured with the parasitic capacitance between the main line 2 and the sub-line 3 and the inductor of the parallel circuit. As described above, since the inductance of the parallel circuit is smaller than the inductance of the phase shift circuit 5, the resonant frequency of the resonance circuit is higher than the frequency band of a signal flowing in the main line 2. As a result, the situation in which the resonant frequency of the resonance circuit causes the loss in signals flowing in the main line 2 can be suppressed.

In the third mode, in the case where the forward signal S1 is detected (see FIG. 4), in the sub-line 3 used, the fifth switch 25 is made conductive so that the first end 34*a* of the fourth sub-line 34 is connected to the third connection terminal 13, and the eighth switch 28 is made conductive so that the second end 34*b* of the fourth sub-line 34 is connected to the termination circuit 4. The remaining switches (first to fourth switches 21 to 24, sixth switch 26, and seventh switch 27) are made non-conductive.

In the third mode, in the case where a backward signal is detected (illustration is omitted), in the sub-line 3 used, the sixth switch 26 is made conductive so that the first end 34*a* of the fourth sub-line 34 is connected to the termination circuit 4, and the seventh switch 27 is made conductive so that the second end 34*b* of the fourth sub-line 34 is connected to the third connection terminal 13. The remaining switches (first to fifth switches 21 to 25 and eighth switch 28) are made non-conductive.

In the third mode, the directional coupler 1 extracts, as a detection signal, part of a signal of the third frequency band (detection target signal) out of high frequency signals flowing in the main line 2 from the sub-line 3, and outputs the detection signal from the third connection terminal 13 to an external device (for example, a detector). At this time, as described above, by connecting the inductor component of the first short-circuit path 8 in parallel with the inductor of the phase shift circuit 5, the situation in which the resonant frequency of the resonance circuit causes the loss in signals flowing in the main line 2 can be suppressed.

2.4 Fourth Mode

Figure 5:
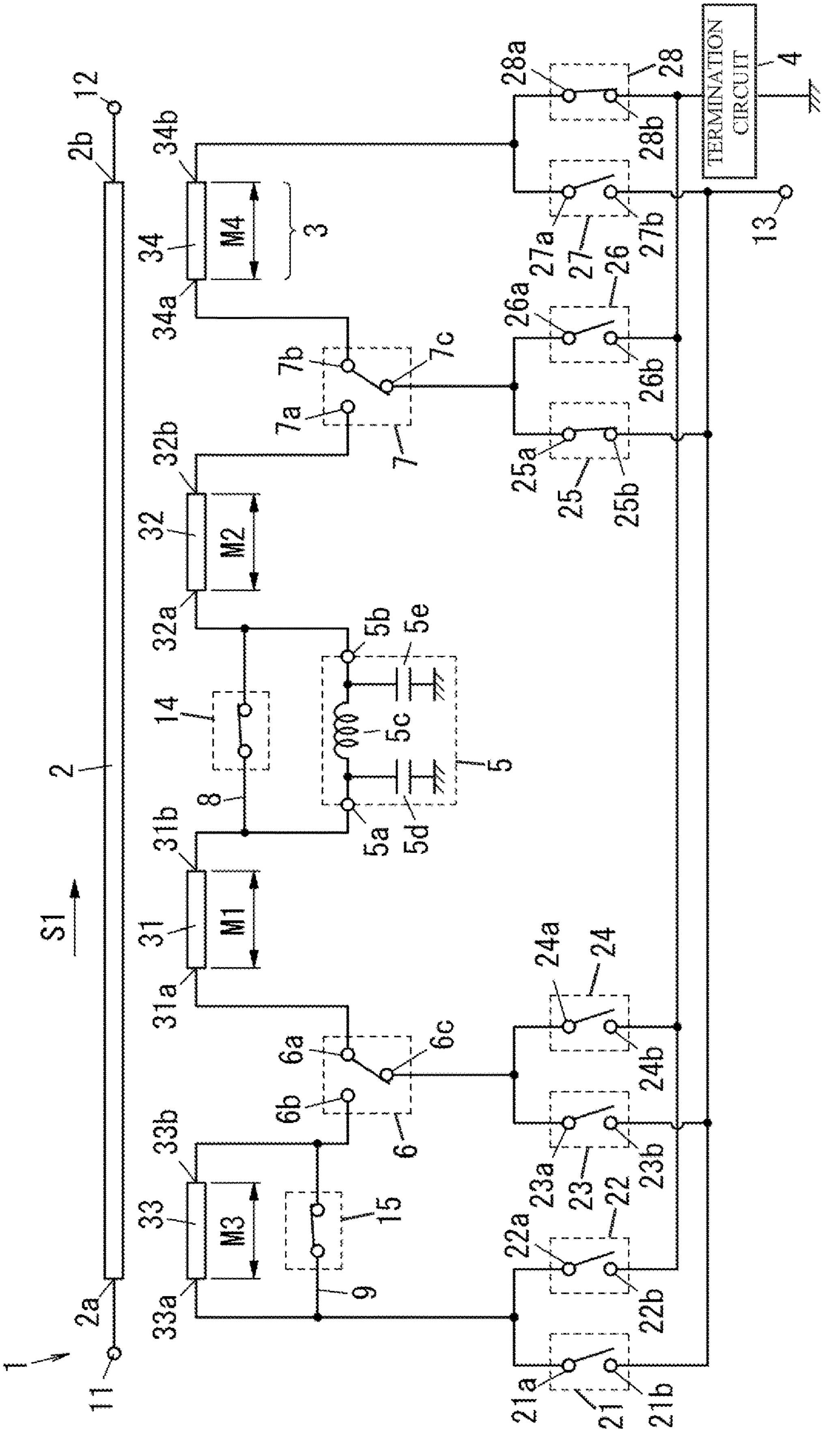
FIG. 5 is a circuit diagram for explaining a fourth mode of the directional coupler.

The fourth mode will be described with reference to FIG. 5. The fourth mode is a mode in which the second short-circuit switch 15 is made conductive in the third mode so that both ends of the third sub-line 33 that is not used are short-circuited by the second short-circuit path 9. Thus, in the fourth mode, only a signal of the fourth frequency band, which is higher between the third frequency band and the fourth frequency band, can be detected.

More particularly, in the fourth mode, the directional coupler 1 uses the sub-line 3 including the fourth sub-line 34, as in the third mode. Thus, the second selector switch 7 connects the selection terminal 7*b* with the selection terminal 7*c*. Furthermore, the first selector switch 6 connects the common terminal 6*a* with the selection terminal 6*c*. The first selector switch 6 does not necessarily connect the common terminal 6*a* with both the selection terminals 6*b* and 6*c*. Furthermore, the first short-circuit switch 14 is made conductive. The second short-circuit switch 15 is made non-conductive, as described above.

The sub-line 3 used in the fourth mode has the shortest line length among the sub-lines 3 used in the first to fourth modes, as in the third mode. Furthermore, as described above, in the fourth mode, the second short-circuit switch 15 is made conductive so that the short circuit of the third sub-line 33, which is not used, by the second short-circuit path 9 is enabled. Thus, the sub-line 3 used in the fourth mode is capable of detecting a signal of the fourth frequency band, which is higher than the frequency band (third frequency band) detected in the third mode.

In the fourth mode, the first short-circuit switch 14 is made conductive so that the first short-circuit path 8 is connected in parallel with the phase shift circuit, as in the third mode. Thus, in the fourth mode, the situation in which the resonant frequency of the resonance circuit causes the loss in signals flowing in the main line 2 can be suppressed, as in the third mode.

In the fourth mode, in the case where the forward signal Si is detected (see FIG. 5), in the sub-line 3 used, the fifth switch 25 is made conductive so that the first end 34*a* of the fourth sub-line 34 is connected to the third connection terminal 13, and the eighth switch 28 is made conductive so that the second end 34*b* of the fourth sub-line 34 is connected to the termination circuit 4, as in the third mode. The remaining switches (first to fourth switches 21 to 24, sixth switch 26, and seventh switch 27) are made non-conductive.

Furthermore, in the fourth mode, in the case where a backward signal is detected (illustration is omitted), in the sub-line 3 used, the sixth switch 26 is made conductive so that the first end 34*a* of the fourth sub-line 34 is connected to the termination circuit 4, and the seventh switch 27 is made conductive so that the second end 34*b* of the fourth sub-line 34 is connected to the third connection terminal 13, as in the third mode. The remaining switches (first to fifth switches 21 to 25 and eighth switch 28) are made non-conductive.

In the fourth mode, the directional coupler 1 extracts, as a detection signal, part of a signal of the fourth frequency band (detection target signal) out of high frequency signals flowing in the main line 2 from the sub-line 3, and outputs the detection signal from the third connection terminal 13 to an external device (for example, a detector). As described above, in the fourth mode, by enabling the short circuit of the first short-circuit path 8 and thus connecting the first short-circuit path 8 in parallel with the phase shift circuit 5, the situation in which the resonant frequency of the resonance circuit causes the loss in signals flowing in the main line 2 can be suppressed. That is, the situation in which the directional coupler 1 causes the loss in signals flowing in the main line 2 can be suppressed.

3 Regarding Characteristics of Directivity of Directional Coupler

As illustrated in FIG. 1, in the first embodiment, the phase shift circuit 5 is connected between the center two sub-lines (first sub-line 31 and second sub-line 32) out of the four sub-lines (first to fourth sub-lines 31 to 34). The line length M1 of the first sub-line 31 and the line length M2 of the second sub-line 32 are the same length. The first sub-line 31 and the second sub-line 32 are used as the sub-line 3 for the second mode, and the fourth sub-line 34 is used as the sub-line 3 for the third mode and the fourth mode.

That is, the situation does not happen where one of the first sub-line 31 and the second sub-line 32 is used as the sub-line 3 for the third mode and the fourth mode (modes in which a signal of a relatively high frequency is detected) and the other one of the first sub-line 31 and the second sub-line 32 is used as the sub-line 3 for the second mode (a mode in which a signal of a middle frequency band is detected). Thus, the adjustment of the line lengths M1 and M2 of the first sub-line 31 and the second sub-line 32, respectively, to adjust the suitability of the sub-line 3 for the second mode, can be made independent of the third mode and the fourth mode. Therefore, the line length M1 of the first sub-line 31 and the line length M2 of the second sub-line 32 can be adjusted to the same length.

In the first embodiment, the phase shift circuit 5 is connected between the center two sub-lines (first sub-line 31 and second sub-line 32) out of the four sub-lines (first to fourth sub-lines 31 to 34). Thus, the arrangement of the phase shift circuit 5 among the four sub-lines (first to fourth sub-lines 31 to 34) is the same between the case where the arrangement is seen from the point of view of a signal flowing in the main line 2 in a forward direction (forward signal) and the case where the arrangement is seen from the point of view of a signal flowing in the main line 2 in a backward direction (backward signal). Therefore, in the case where the directional coupler 1 has bidirectional characteristics, variations in the characteristics regarding the directivity between the case where a forward signal is detected and the case where a backward signal is detected can be reduced.

Furthermore, the line length M1 of the first sub-line 31 and the line length M2 of the second sub-line 32 are the same length. Thus, in the case where the directional coupler 1 has bidirectional characteristics, variations in the characteristics of directivity between the case where a forward signal is detected and the case where a backward signal is detected can further be reduced.

4 Effects Achieved by the Short Circuit of Non-Used Phase Shift Circuit

As described above, in the first embodiment, in the third mode and the fourth mode, the phase shift circuit 5 that is not used is short-circuited by the first short-circuit path 8. Thus, the situation in which the directional coupler 1 causes the loss in signals flowing in the main line 2 can be suppressed.

Figure 6:
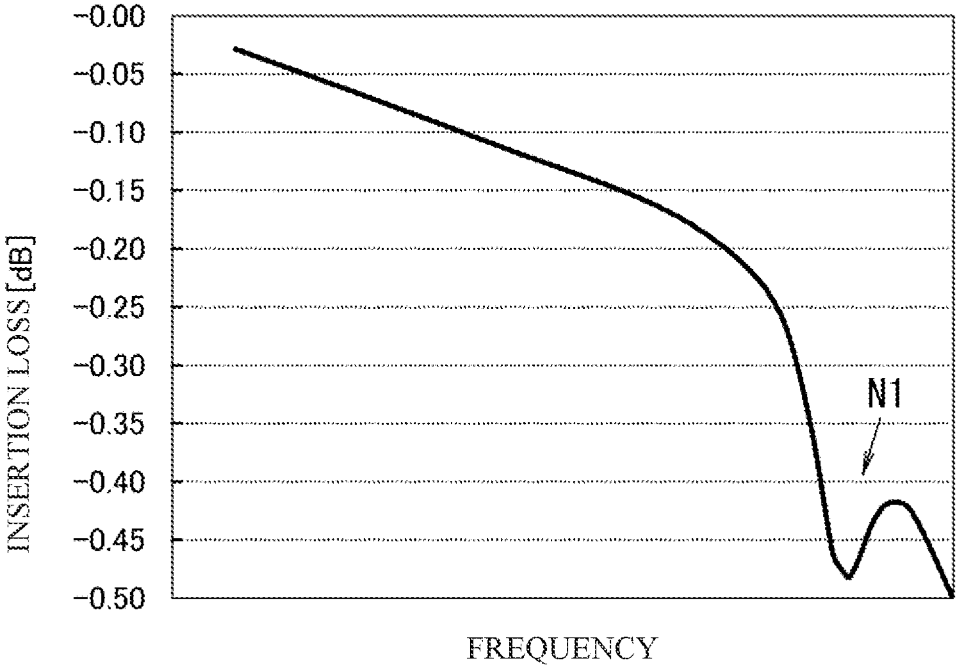
FIG. 6 is a graph indicating insertion loss of a directional coupler according to a comparative example.
Figure 7:
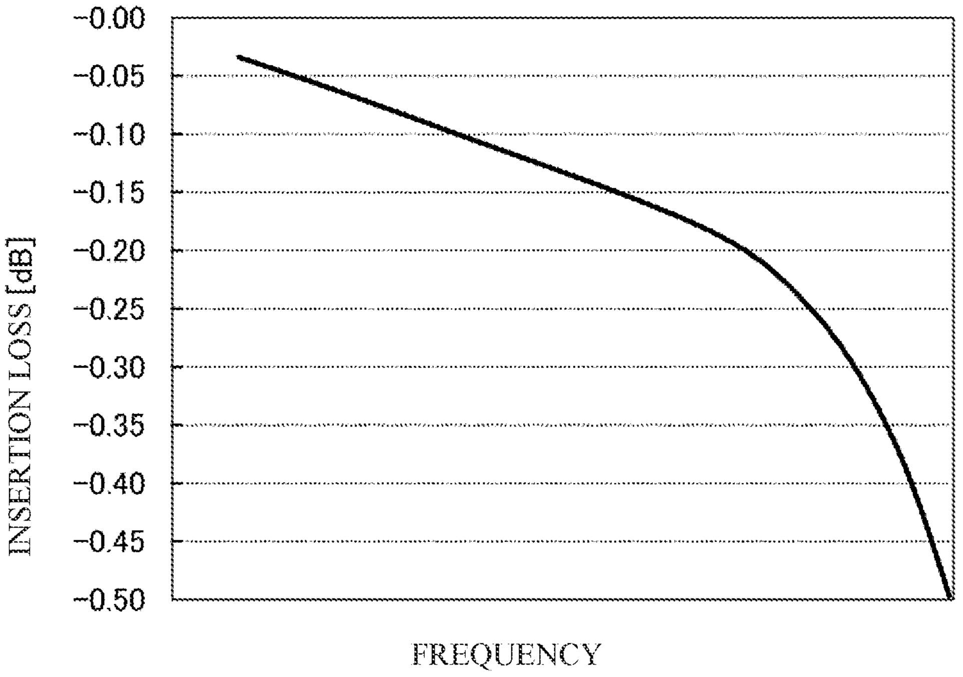
FIG. 7 is a graph indicating insertion loss of the directional coupler according to the first embodiment.

FIG. 6 indicates the insertion loss (the insertion loss in signals flowing in the main line 2) of a directional coupler according to a comparative example. The comparative example is a case where the phase shift circuit 5 that is not used is not short-circuited in the third mode and the fourth mode in the directional coupler 1 according to the first embodiment. FIG. 7 indicates the insertion loss (the insertion loss in signals flowing in the main line 2) of the directional coupler 1 according to the first embodiment. In the directional coupler 1 according to the first embodiment, as described above, the phase shift circuit 5 that is not used in the third mode and the fourth mode is short-circuited by the first short-circuit path 8. In FIGS. 6 and 7, the horizontal axis represents frequency [GHz], and the vertical axis represents insertion loss [dB].

As is clear from FIG. 6, a notch N1 is generated on a high frequency side, and the absolute value of the insertion loss sharply increases at frequencies lower than the notch N1. Furthermore, as is clear from FIG. 7, in the directional coupler 1 according to the first embodiment, since no notch is generated on a high frequency side, the absolute value of the insertion loss gradually increases on the high frequency side compared to the comparative example. As described above, it is clear that the directional coupler 1 according to the first embodiment improves the insertion loss. Thus, it is understood that the directional coupler 1 according to the first embodiment is capable of reducing the loss in signals flowing in the main line 2.

5 Effects Achieved by the Short Circuit of Non-Used Third Sub-Line

In the first embodiment, as described above, the third sub-line 33 that is not used is not short-circuited by the second short-circuit path 9 in the third mode, and the third sub-line 33 that is not used is short-circuited by the second short-circuit path 9 in the fourth mode. Thus, a frequency band (fourth frequency band) detected in the fourth mode is higher than a frequency band (third frequency band) detected in the third mode.

Figure 8:
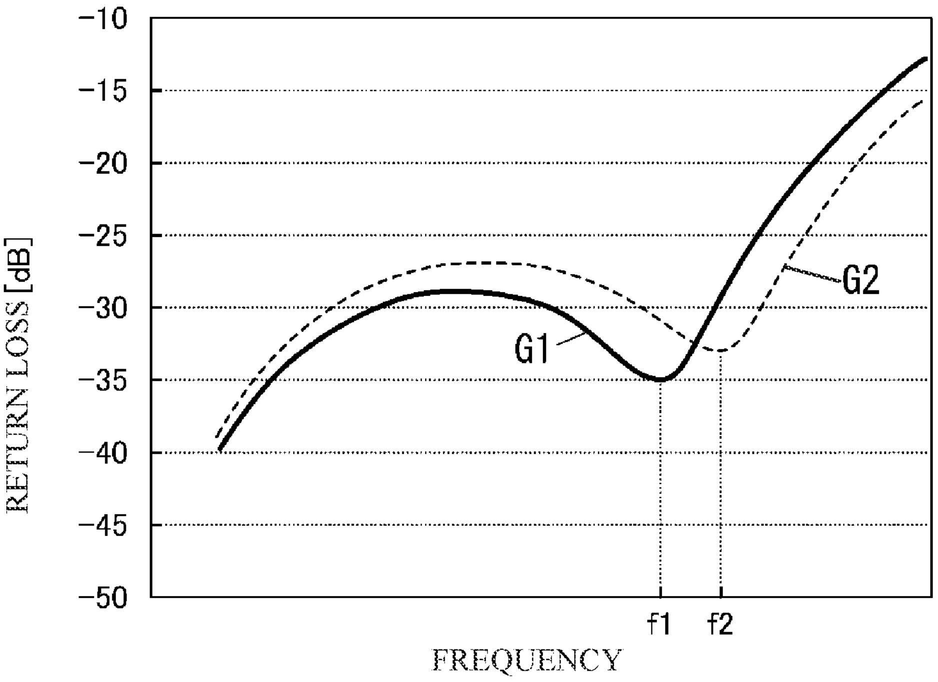
FIG. 8 is a graph indicating return loss of the directional coupler in the third mode and the fourth mode.

In FIG. 8, a graph G1 indicates the return loss in the third mode, and a graph G2 indicates the return loss in the fourth mode. In FIG. 8, a sign f1 represents a first frequency at which the return loss in the third mode exhibits a minimal value, and sign f2 represents a second frequency at which the return loss in the fourth mode exhibits a minimal value.

As is clear from FIG. 8, in both the graphs G1 and G2 in a similar manner, after increasing and then decreasing to minimal values in a direction from lower frequencies toward higher frequencies, the return losses increase as the frequency increases. Furthermore, as is clear from FIG. 8, since the second frequency f2 is higher than the first frequency f1, the return loss in the graph G2 is smaller than the return loss in the graph G1 at frequencies higher than the second frequency f2 (that is, at frequencies higher than the second frequency f2, the return loss in the fourth mode is smaller than the return loss in the third mode). That is, it is clear that the loss is small in the fourth mode even when the detection is performed in a higher frequency band, compared to the case where the detection is performed in the third mode in the higher frequency band. Accordingly, it is understood that the fourth mode is more suitable for the detection of a higher frequency band than the third mode. Therefore, a frequency band (fourth frequency band) detected in the fourth mode is higher than a frequency band (third frequency band) detected in the third mode.

6 Effects

The directional coupler 1 according to the first embodiment includes the main line 2, the first sub-line 31, the second sub-line 32, the phase shift circuit 5 (first phase shift circuit), the first short-circuit path 8, and the first short-circuit switch 14. The first phase shift circuit 5 is connected between the first sub-line 31 and the second sub-line 32. The first short-circuit path 8 short-circuits the ends 5*a* and 5*b* of the phase shift circuit 5. The first short-circuit switch 14 switches between conduction and non-conduction of the first short-circuit path 8.

With this arrangement, the phase shift circuit 5 is connected between the first sub-line 31 and the second sub-line 32. Thus, with the use of the sub-line 3 including the first sub-line 31 and the second sub-line 32, and the phase shift circuit 5, when the second signal, out of the first signal and the second signal of different frequency bands that flow at the same time in the main line 2, is detected, the leakage of the first signal, which is a non-detection target signal, into the sub-line 3 can be suppressed by the first phase shift circuit 5.

Furthermore, in the case where the phase shift circuit 5 is not used, due to the resonant frequency of the resonance circuit including the inductor 5*c* of the phase shift circuit 5 and the parasitic capacitance between the sub-line 3 and the main line 2, loss may occur in signals flowing in the main line 2. However, in the first embodiment, in the case where the phase shift circuit 5 is not used, by switching the first short-circuit switch 14 to be conductive, the inductor component of the first short-circuit path 8 can be connected in parallel with the inductor 5*c* of the phase shift circuit 5. Thus, the inductance of the entire inductor of the resonance circuit can be reduced. Accordingly, the resonant frequency of the resonance circuit can thus be higher than the frequency band of a signal flowing in the main line 2. Consequently, by making the first short-circuit path 8 conductive when the phase shift circuit 5 is not used, the situation in which the resonant frequency of the resonance circuit causes the loss in signals flowing in the main line 2 can be suppressed.

As described above, the loss in signals flowing in the main line 2 can be reduced, and when a detection target signal flowing in the main line 2 is detected, the leakage of a non-detection target signal, which flows in the main line 2 concurrently with the detection target signal, into the sub-line 3 can be suppressed.

7 Modifications

Modifications of the first embodiment will be described.

7-1 First Modification

The phase shift circuit 5 according to the first embodiment includes circuit components (inductor 5*c* and capacitors 5*d* and 5*e*) with fixed characteristic values. A "characteristic value of a circuit component" represents a value defining characteristics regarding a function of the circuit component and represents a resistance in the case where the circuit component is a variable resistor, a capacitance in the case where the circuit component is a capacitor, and an inductance in the case where the circuit component is an inductor. In contrast, the phase shift circuit 5 according to this modification includes a circuit component (variable capacitor) with a characteristic value. That is, the phase shift circuit 5 according to this modification is a circuit in which circuit components (inductor 5*c* and capacitors 5*d* and 5*e*) of the phase shift circuit 5 according to the first embodiment are replaced with a circuit component (variable capacitor) whose characteristic value is variable.

According to this modification, the characteristic value of a circuit component configuring the phase shift circuit 5 can be adjusted. Therefore, the frequency characteristics regarding the degree of coupling between the sub-line 3 and the main line 2 used in each mode can be finely adjusted. Thus, when part of the second signal, out of the first signal and the second signal that flow at the same time in the main line 2, is extracted from the sub-line 3, the occurrence of the loss in the first signal flowing in the main line 2 can further be suppressed. Furthermore, even if the frequency characteristics regarding the degree of coupling change according to a change in the impedance or the like of the sub-line 3 used in the first mode and the second mode, the frequency characteristics regarding the degree of coupling can be easily adjusted.

7-2 Second Modification

In the first embodiment, a short-circuit path (second short-circuit path 9) and a short-circuit switch (second short-circuit switch 15) are provided only at the third sub-line 33, out of the four sub-lines (first to fourth sub-lines 31 to 34). However, the short-circuit path and the short-circuit switch may be provided at at least one sub-line out of the four sub-lines.

7-3 Third Modification

In the first embodiment, out of the four sub-lines (first to fourth sub-lines 31 to 34), the line length M1 of the first sub-line 31 and the line length M2 of the second sub-line 32 are the same length. However, out of the four sub-lines, the line lengths of only at least the first sub-line 31 and the second sub-line 32 need to be the same length. Thus, variations in the characteristics regarding the directivity of the directional coupler 1 between the case where the characteristics are seen from the point of view of a signal flowing in the main line 2 in the forward direction (forward signal) and the case where the characteristics are seen from the point of view of a signal flowing in the main line 2 in the backward direction (backward signal) can further be suppressed.

Second Embodiment

In a second embodiment, an example of the structure of the directional coupler 1 described above in the first embodiment will be described. The same component elements as those in the first embodiment will be denoted by the same signs as those in the first embodiment, and the description of those component elements may be omitted.

1 Example of Structure of Directional Coupler

Figure 9:
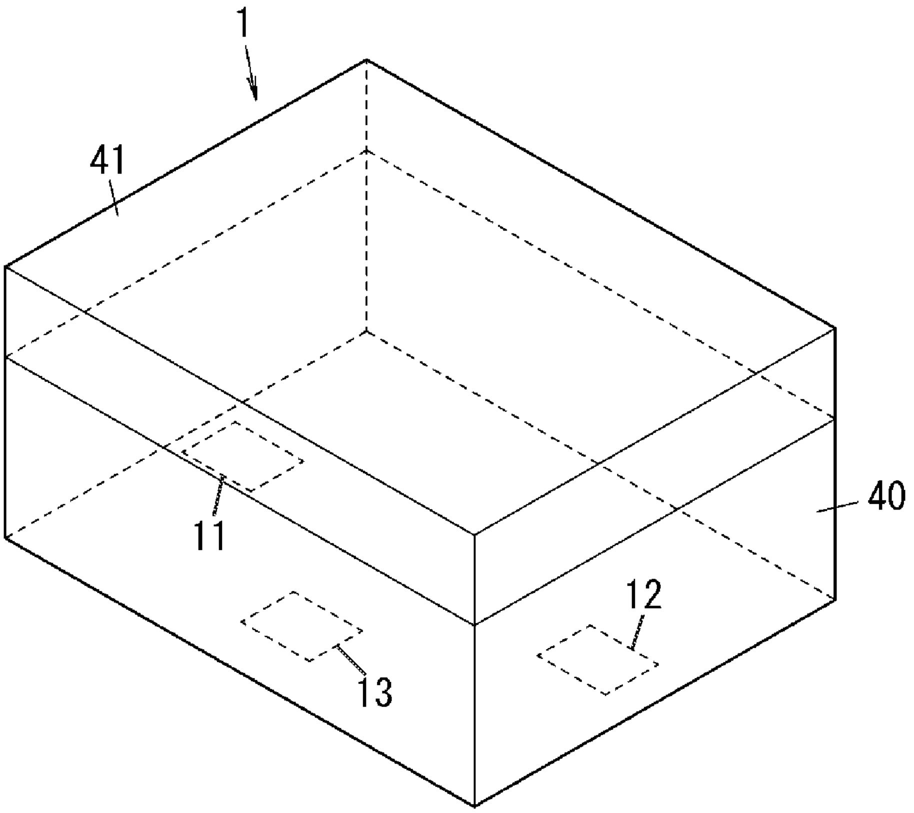
FIG. 9 is a perspective view of a directional coupler according to a second embodiment.
Figure 10:
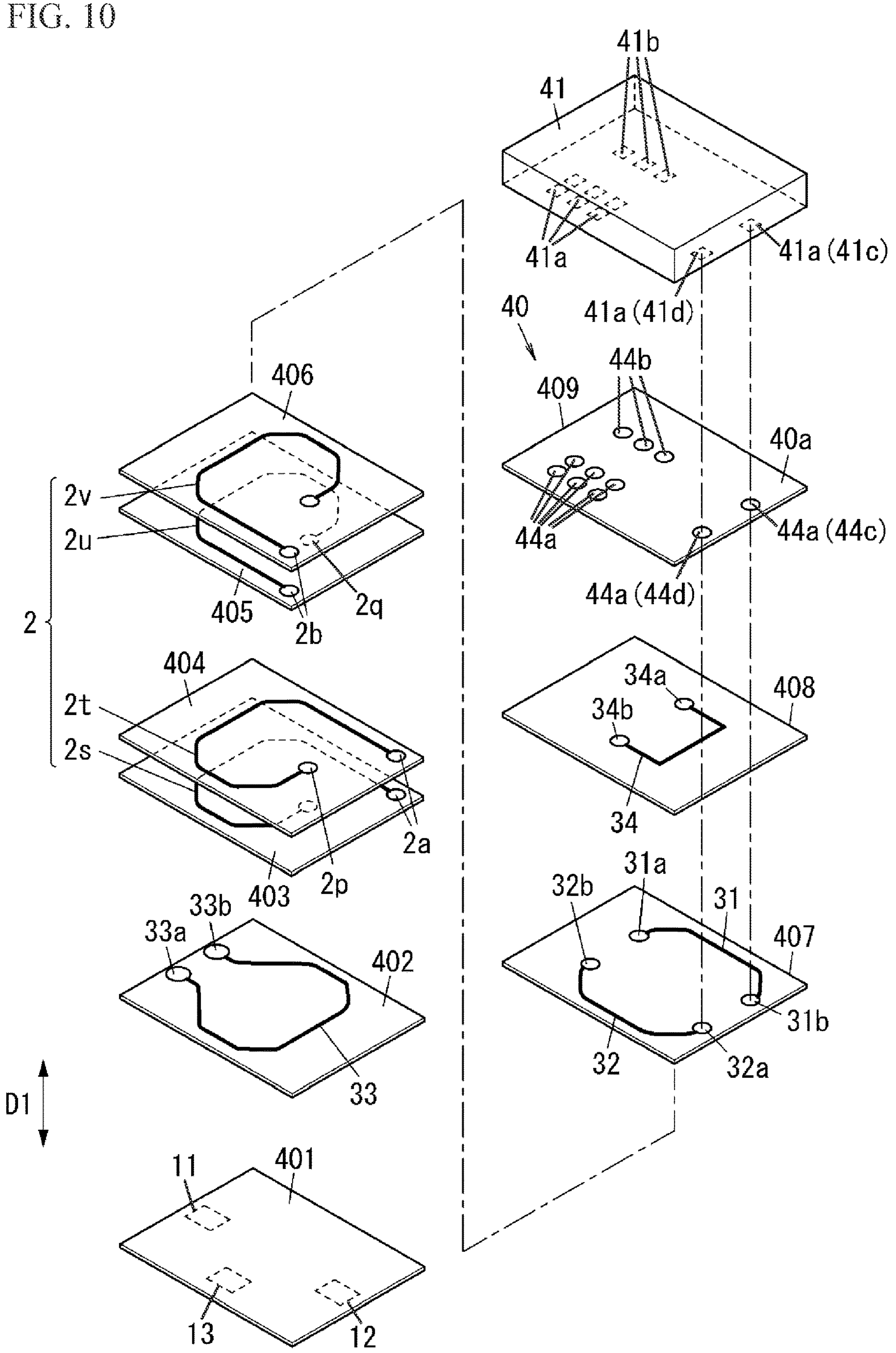
FIG. 10 is an exploded perspective view of the directional coupler.

As illustrated in FIGS. 9 and 10, the directional coupler 1 according to the second embodiment includes a mounting substrate 40 and an integrated circuit (IC) chip 41.

The IC chip 41 is a semiconductor IC including the first selector switch 6, the second selector switch 7, the first short-circuit switch 14, the second short-circuit switch 15, the first short-circuit path 8, the second short-circuit path 9, the first to eighth switches 21 to 28, a control circuit, the termination circuit 4, and the phase shift circuit 5 illustrated in FIG. 1. The control circuit controls the first selector switch 6, the second selector switch 7, the first short-circuit switch 14, the second short-circuit switch 15, and the first to eighth switches 21 to 28 in accordance with the control signals from the outside. That is, the IC chip 41 is configured to be integrated with the first selector switch 6, the second selector switch 7, the first short-circuit switch 14, the second short-circuit switch 15, the first to eighth switches 21 to 28, the control circuit, the termination circuit 4, and the phase shift circuit 5.

Furthermore, a plurality of external terminals 41*a* and a plurality of external terminals 41*b* are provided on a rear surface of the IC chip 41 (a main surface near the mounting substrate 40) (see FIG. 10). The plurality of external terminals 41*a* are connected to a plurality of terminals 44*a*, which will be described later, of the mounting substrate 40 in a one-to-one relationship by solder or other materials. The plurality of external terminals 41*b* are connected to a plurality of terminals 44*b*, which will be described later, of the mounting substrate 40 by solder or other materials in a one-to-one relationship.

The mounting substrate 40 is, for example, a multilayer substrate including a plurality of (in the example illustrated in the drawing, nine) dielectric layers (first to ninth layers 401 to 409). The first to ninth layers each have a first surface and a second surface. The first surface is a main surface that is near the IC chip 41, and the second surface is a main surface that is far away from the IC chip 41.

The main line 2 is divided into a first half part (first part 2*s* and second part 2*t*), which is a half part near the first end 2*a*, and a second half part (third part 2*u* and fourth part 2*v*), which is a half part near the second end 2*b*. Furthermore, the first half part of the main line 2 has a two-layer structure including the first part 2*s* on a lower layer side and the second part 2*t* on an upper layer side. The second half part (third part 2*u* and fourth part 2*v*) of the main line 2 has a two-layer structure including the third part 2*u* on a lower layer side and the fourth part 2*v* on an upper layer side.

The first, second, and third connection terminals 11, 12, and 13 of the directional coupler 1 are disposed on the second surface of the first layer 401. The third sub-line 33 is formed on the first surface of the second layer 402. The first part 2*s* of the main line 2 is formed on the first surface of the third layer 403, and the second part 2*t* of the main line 2 is formed on the first surface of the fourth layer 404. The first part 2*s* and the second part 2*t* are connected by a plurality of via conductors. The third part 2*u* of the main line 2 is formed on the first surface of the fifth layer 405, and the fourth part 2*v* of the main line 2 is formed on the first surface of the sixth layer 406. The third part 2*u* and the fourth part 2*v* are connected by a plurality of via conductors. One end (an end that is far away from the first end 2*a*) 2*p* of the second part 2*t* and one end (an end that is far away from the second end 2*b*) 2*q* of the third part of the main line 2 are connected by a via conductor (illustration is omitted). The first sub-line 31 and the second sub-line 32 are formed on the first surface of the seventh layer 407. The fourth sub-line 34 is formed on the first surface of the eighth layer 408.

A plurality of (for example, eleven) terminals are formed at the ninth layer 409. The plurality of terminals include the eight terminals 44*a* and the three terminals 44*b*. The eight terminals 44*a* are connected to the first ends 31*a*, 32*a*, 33*a*, and 34*a* and the second ends 31*b*, 32*b*, 33*b*, and 34*b* of the first to fourth sub-lines 31 to 34 in a one-to-one relationship with via conductors and wiring layers interposed therebetween. The three terminals 44*b* are connected to the first to third connection terminals 11 to 13 at the first layer 401 with via conductors and wiring layers interposed therebetween. Furthermore, the eight terminals 44*a* are arranged at positions corresponding to the external terminals 41*a* of the IC chip 41 in a one-to-one relationship and are connected with the corresponding external terminals 41*a* by solder or other materials. Furthermore, the three terminals 44*b* are arranged at positions corresponding to the external terminals 41*b* of the IC chip 41 in a one-to-one relationship and are connected with the corresponding external terminals 41*b* by solder or other materials.

In the mounting substrate 40, as illustrated in FIG. 10, the first layer 401, the second layer 402, the third layer 403, the fourth layer 404, the fifth layer 405, the sixth layer 406, the seventh layer 407, the eighth layer 408, and the ninth layer 409 are laminated in this order from the bottom. Thus, the main line 2 and the first to fourth sub-lines 31 to 34 are provided inside the mounting substrate (multilayer substrate) 40. Furthermore, the IC chip 41 is disposed on a first main surface 40*a* of the mounting substrate 40 (that is, the first surface of the ninth layer 409). The first main surface of the mounting substrate 40 is one main surface of the mounting substrate 40 in a thickness direction D1. A resin layer (illustration is omitted) is disposed on the first main surface of the mounting substrate 40 so as to cover the IC chip 41. Furthermore, the size of the IC chip 41 may be smaller than the size of the first main surface of the mounting substrate 40. In this case, part of the resin layer covering the IC chip 41 is arranged so as to cover the first main surface of the mounting substrate 40.

In the second embodiment, the second end 31*b* of the first sub-line 31 is connected to a terminal 44*c* with a via conductor and a wiring layer interposed therebetween. By soldering between the terminal 44*c* and an external terminal 41*c* of the IC chip 41, the second end 32*b* of the first sub-line 31 is connected to the external terminal 41*c*. The first end 32*a* of the second sub-line 32 is connected to a terminal 44*d* with a via conductor and a wiring layer interposed therebetween. By soldering between the terminal 44*d* and the external terminal 41*d* of the IC chip 41, the first end 31*a* of the second sub-line 32 is connected to the external terminal 41*d*. Out of the plurality of terminals 44*a*, the terminals 44*c* and 44*d* are predetermined two terminals. Out of the plurality of external terminals 41*a*, the external terminals 41*c* and 41*d* are predetermined two external terminals.

In the directional coupler 1, the main line 2 (that is, the first to fourth parts 2*s*, 2*t*, 2*u*, and 2*v*), the first to fourth sub-lines 31 to 34, and the IC chip 41 overlap in plan view from the thickness direction D1 of the mounting substrate 40 (see FIG. 10). Thus, the distance of the connection between the IC chip 41 and the directional coupler 1 can be shortened. As a result, the generation of an unwanted inductor in wires for connecting the IC chip 41 to the directional coupler 1 can be suppressed. The IC chip 41 and only at least one of the main line 2 and the first to fourth sub-lines 31 to 34 need to overlap in plan view from the thickness direction D1 of the mounting substrate 40.

Furthermore, in the directional coupler 1, the phase shift circuit 5 is integrated with the IC chip 41, as described above. Thus, the phase shift circuit 5 can be physically disposed away from the main line 2, which is disposed inside the mounting substrate 40. Therefore, unwanted coupling between the phase shift circuit 5 and the main line 2 can be prevented. Furthermore, since the IC chip 41 is integrated with the phase shift circuit 5, the first short-circuit switch 14, the first selector switch 6, and the second selector switch 7, the phase shift circuit 5 is disposed in adjacent to the first short-circuit switch 14, the first selector switch 6, and the second selector switch 7. Therefore, the distance of the connection between the phase shift circuit 5 and the first short-circuit switch 14, the first selector switch 6, and the second selector switch 7 can be shortened.

Figure 11:
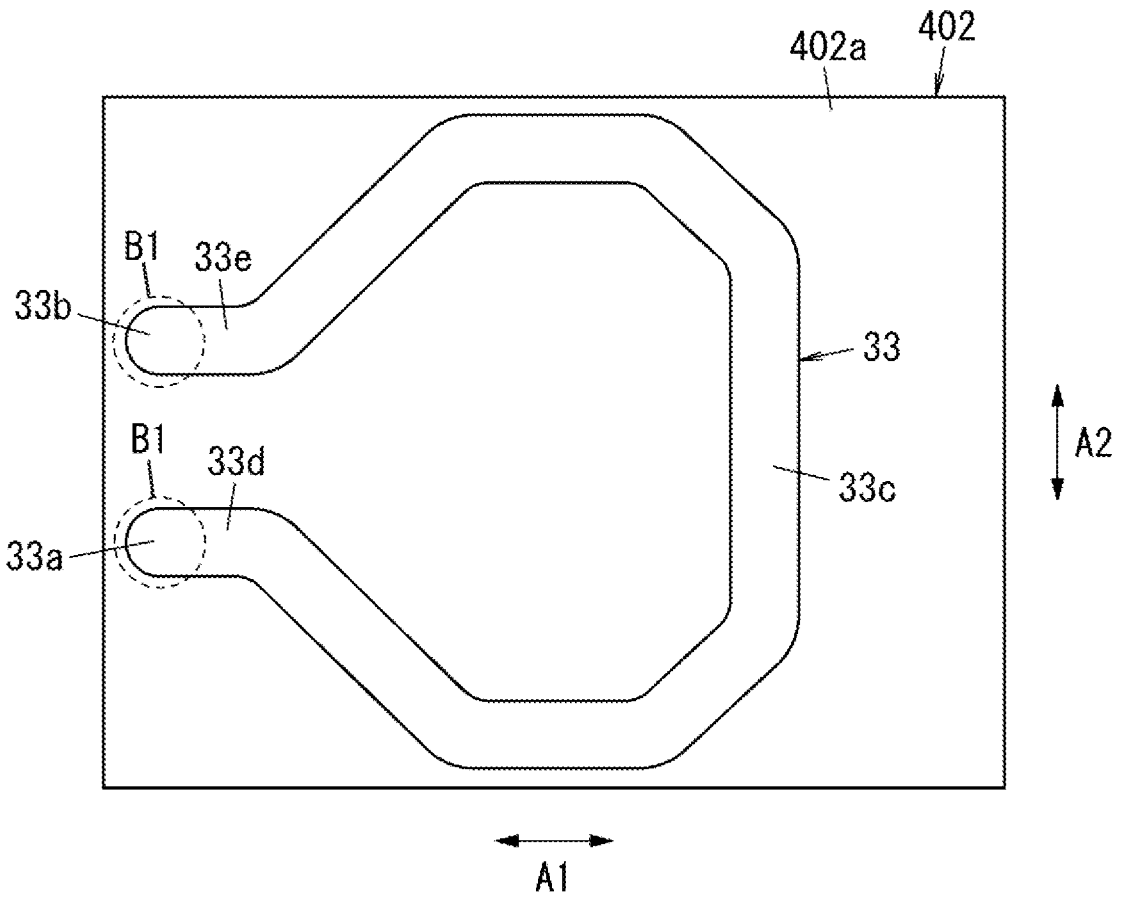
FIG. 11 is a plan view of a third sub-line formed at a second layer of a mounting substrate of the directional coupler.

2 Shapes of Main Line and First to Fourth Sub-Lines at Layers of Mounting Substrate 2-1 Shape of Third Sub-Line at Second Layer As illustrated in FIG. 11, the third sub-line 33 is pattern-formed on a first surface 402*a* of the second layer 402. On the first surface 402*a*, a first direction A1 and a second direction A2 that are orthogonal to each other are defined as in FIG. 11 and other figures. Furthermore, for example, a right side in the first direction A1 in FIG. 11 and other figures is defined as a first side, and a left side in the first direction A1 is defined as a second side. Furthermore, for example, an upper side in the second direction A2 is defined as a third side, and a lower side in the second direction A2 is defined as a fourth side.

The third sub-line 33 includes a ring-opened part 33*c*, a first extension part 33*d*, and a second extension part 33*e*. The ring-opened part 33*c* has a ring shape in which part of substantially a full circle is open (that is, substantially a C shape), and part of the ring-opened part 33*c* on the second side in the first direction A1 is open. The ring-opened part 33*c* has a first end and a second end, which are both ends of the opened part. The first extension part 33*d* extends in a straight line from the first end of the ring-opened part 33*c* toward the second side in the first direction A1. The second extension part 33*e* extends in a straight line from the second end of the ring-opened part 33*c* toward the second side in the first direction A1. The first end 33*a* of the third sub-line 33 is an end of the first extension part 33*d* on the second side in the first direction A1. The second end 33*b* of the third sub-line 33 is an end of the second extension part 33*e* on the second side in the first direction A1.

The first end 33*a* and the second end 33*b* of the third sub-line 33 are connected to the determined terminals 44*a* at the ninth layer 409 with wiring paths such as via conductors B1 interposed therebetween.

2-2 Shape of First Part of Main Line at Third Layer

Figure 12:
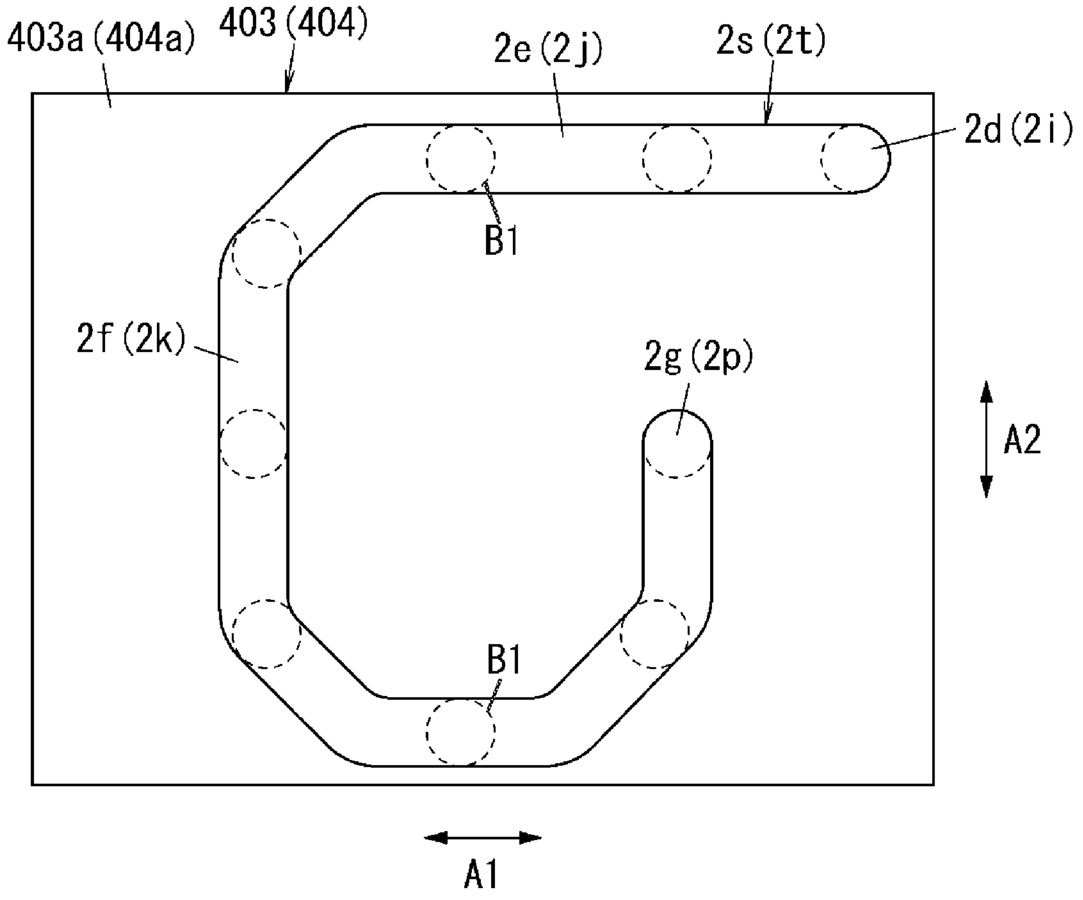
FIG. 12 is a plan view of a first part of a main line formed at a third layer of the mounting substrate and a plan view of a second part of the main line formed at a fourth layer of the mounting substrate.

As illustrated in FIG. 12, the first part 2*s* of the main line 2 is pattern-formed on a first surface 403*a* of the third layer 403. On the first surface 403*a*, the first direction A1 and the second direction A2 that are orthogonal to each other are defined as in FIG. 12.

The first part 2*s* of the main line 2 includes a ring-opened part 2*f* and an extension part 2*e*. The ring-opened part 2*f* has a ring shape in which part of substantially a ¾ circle is open (that is, substantially a C shape), and part of the ring-opened part 2*f* on the third side in the second direction A2 and the first side in the first direction A1 is open. The ring-opened part 2*f* has a first end and a second end 2*g*, which are both ends of the opened part. The extension part 2*e* extends in a straight line from the first end of the ring-opened part 2*f* toward the first side in the first direction A1. An end of the extension part 2*e* on the first side in the first direction A1 is closer to the first side in the first direction A1 than the second end 2*g* of the ring-opened part 2*f* is and configures the first end 2*a* of the main line 2.

A plurality of via conductors B1 for connecting with the second part 2*t* of the main line 2 are connected to the first part 2*s* of the main line 2. The plurality of via conductors B1 are disposed with spaces therebetween along the first part 2*s*.

2-3 Shape of Second Part of Main Line at Fourth Layer

As illustrated in FIG. 12, the second part 2*t* of the main line 2 is pattern-formed on a first surface 404*a* of the fourth layer 404. The second part 2*t* of the main line 2 has the same shape and the same size as the first part 2*s* of the main line 2. The shape of the first part 2*s* of the main line 2 and the shape of the first part 2*s* provided at the third layer 403 match in plan view from the thickness direction D1 of the mounting substrate 40. Thus, as with the first part 2*s* of the main line 2, the second part 2*t* of the main line 2 includes an extension part 2*j* and a ring-opened part 2*k*. Since the shapes of the extension part 2*j* and the ring-opened part 2*k* of the second part 2*t* are the same as the shapes of the extension part 2*e* and the ring-opened part 2*f* of the first part 2*s*, the detailed description of the shapes of the extension part 2*j* and the ring-opened part 2*k* of the second part 2*t* will be omitted.

An end of the extension part 2*i* on the first side in the first direction A1 configures the first end 2*a* of the main line 2.

Furthermore, a second end 2*p* of the ring-opened part 2*k* is the one end 2*p* of the second part 2*t* illustrated in FIG. 10.

The second part 2*t* of the main line 2 is connected to the first part 2*s* of the main line 2 by the plurality of via conductors B1, as described above.

2-4 Shape of Third Part of Main Line at Fifth Layer

Figure 13:
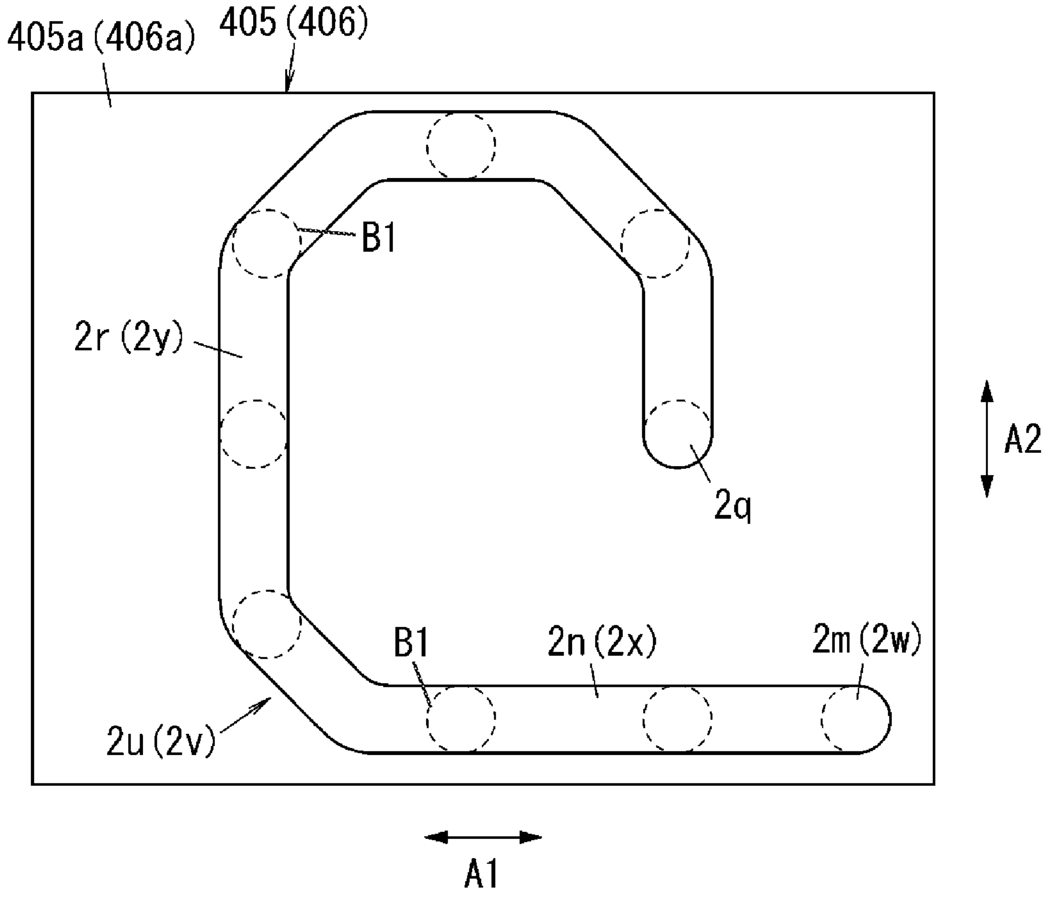
FIG. 13 is a plan view of a third part of the main line formed at a fifth layer of the mounting substrate and a plan view of a fourth part of the main line formed at a sixth layer of the mounting substrate.

As illustrated in FIG. 13, the third part 2*u* of the main line 2 is pattern-formed on a first surface 405*a* of the fifth layer 405. The third part 2*u* of the main line 2 has a shape in which the third side and the fourth side in the second direction A2 are exchanged with each other in the first part 2*s* of the main line 2. Thus, the third part 2*u* of the main line 2 includes a ring-opened part 2*r* and an extension part 2*n*, as with the first part 2*s*. The shapes of the ring-opened part 2*r* and the extension part 2*n* of the third part 2*u* are the same as the shapes of the ring-opened part 2*f* and the extension part 2*e* of the first part 2*s* in the case where the third side and the fourth side in the second direction A2 are exchanged with each other.

More particularly, the ring-opened part 2*r* has a ring shape in which part of substantially a ¾ circle is open (that is, substantially a C shape), and part of the ring-opened part 2*r* on the fourth side in the second direction A2 and the first side in the first direction A1 is open. The ring-opened part 2*r* has a first end and a second end 2*q*, which are both ends of the opened part. The extension part 2*n* extends in a straight line from the first end of the ring-opened part 2*r* toward the first side in the first direction A1. An end 2*m* of the extension part 2*n* on the first side in the first direction A1 is closer to the first side in the first direction A1 than the second end 2*q* of the ring-opened part 2*r* is and configures the second end 2*b* of the main line 2.

A plurality of via conductors B1 for connecting with the fourth part 2*v* of the main line 2 are connected to the third part 2*u* of the main line 2. The plurality of via conductors B1 are disposed with spaces therebetween along the third part 2*u*. Furthermore, the second end 2*q* of the ring-opened part 2*r* of the main line 2 is connected to the second end 2*p* of the ring-opened part 2*k* of the second part 2*t* of the main line 2 with a via conductor interposed therebetween.

2-5 Shape of Fourth Part of Main Line at Sixth Layer)

As illustrated in FIG. 13, the fourth part 2*v* of the main line 2 is pattern-formed on a first surface 406*a* of the sixth layer 406. The fourth part 2*v* of the main line 2 has the same shape and the same size as the third part 2*u* of the main line 2. The shape of the fourth part 2*v* of the main line 2 and the shape of the third part 2*u* provided at the fifth layer 405 match in plan view from the thickness direction D1 of the mounting substrate 40. Thus, as with the third part 2*u* of the main line 2, the fourth part 2*v* of the main line 2 includes a ring-opened part 2*y* and an extension part 2*x*. An end 2*w* of the extension part 2*x* on the first side in the first direction A1 configures the second end 2*b* of the main line 2. Since the shapes of the ring-opened part 2*y* and the extension part 2*x* of the fourth part 2*v* are the same as the shapes of the ring-opened part 2*r* and the extension part 2*n* of the third part 2*u* of the main line 2, the detailed description of the shapes of the ring-opened part 2*y* and the extension part 2*x* of the fourth part 2*v* will be omitted.

The fourth part 2*v* of the main line 2 is connected to the third part 2*u* of the main line 2 by the plurality of via conductors B1, as described above.

2-6 Shapes of First Sub-Line and Second Sub-Line at Seventh Layer

Figure 14:
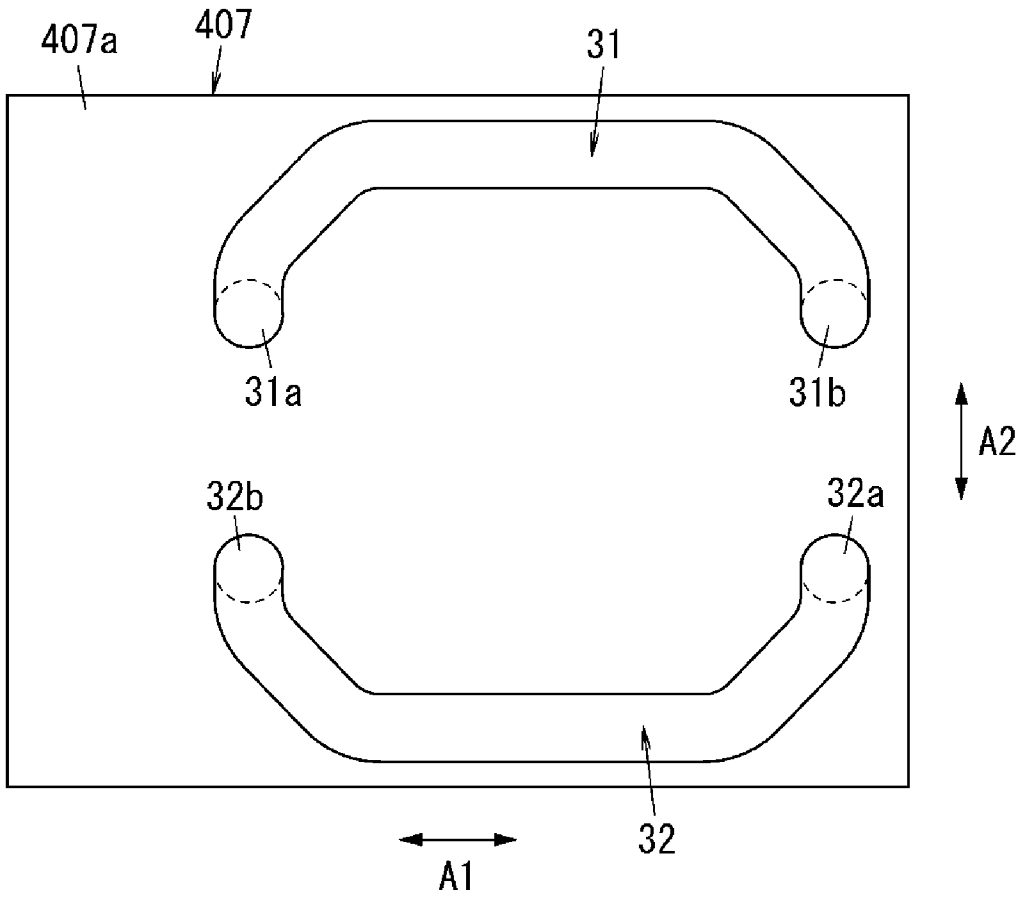
FIG. 14 is a plan view of a first sub-line and a second sub-line formed at a seventh layer of the mounting substrate.

As illustrated in FIG. 14, the first sub-line 31 and the second sub-line 32 are formed on a first surface 407*a* of the seventh layer 407.

The first sub-line 31 and the second sub-line 32 are disposed opposite to each other with a space interposed therebetween in the second direction A2. Each of the first sub-line 31 and the second sub-line 32 extends in the first direction A1. The first end 31*a* of the first sub-line 31 is an end of the first sub-line 31 on the second side in the first direction A1. The second end 31*b* of the first sub-line 31 is an end of the first sub-line 31 on the first side in the first direction A1. Both ends (first end 31*a* and second end 31*b*) of the first sub-line 31 in the first direction A1 are bent and tilted toward the second sub-line 32.

The first end 32*a* of the second sub-line 32 is an end of the second sub-line 32 on the first side in the first direction A1. The second end 32*b* of the second sub-line 32 is an end of the second sub-line 32 on the second side in the first direction A1. Both ends (first end 32*a* and second end 32*b*) of the second sub-line 32 in the first direction A1 are bent and tilted toward the first sub-line 31.

At the ninth layer 409, the first end 31*a* and the second end 31*b* of the first sub-line 31 and the first end 32*a* and the second end 32*b* of the second sub-line 32 are connected to the determined terminals 44*a* with wiring paths such as the via conductors B1 interposed therebetween.

2-7 Shape of Fourth Sub-Line at Eighth Layer

Figure 15:
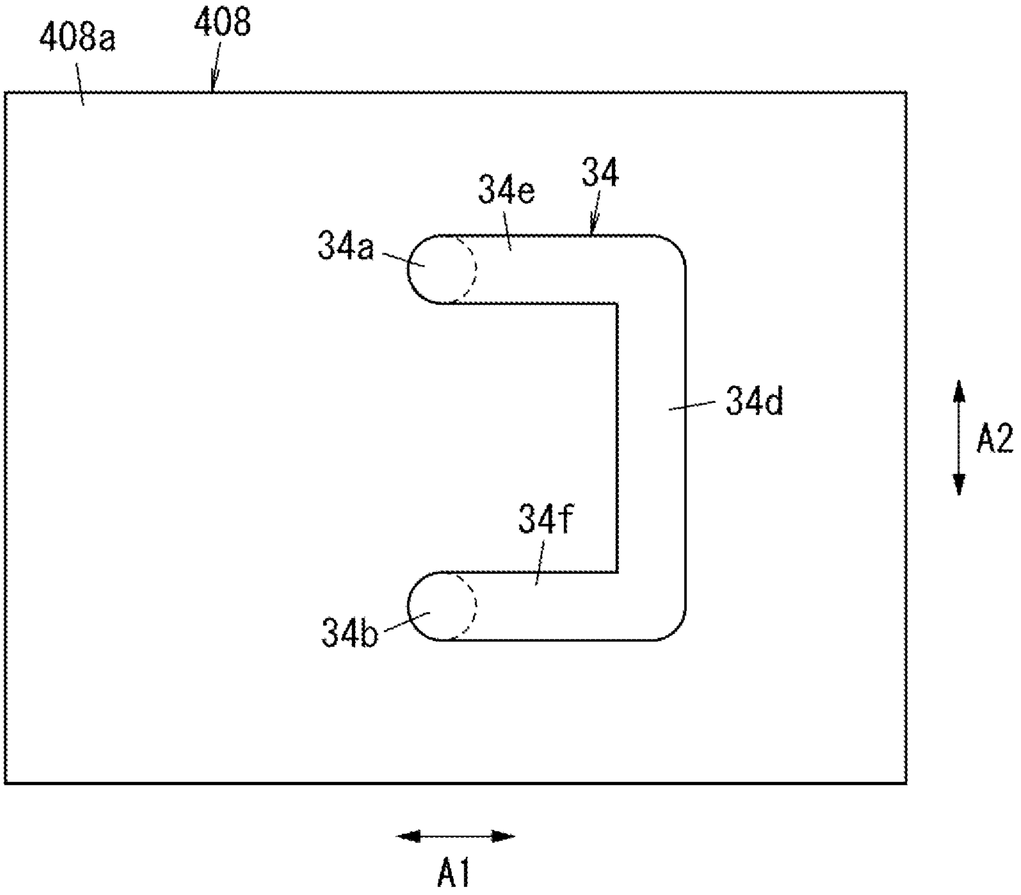
FIG. 15 is a plan view of a fourth sub-line formed at an eighth layer of the mounting substrate.

As illustrated in FIG. 15, the fourth sub-line 34 is pattern-formed on a first surface 408*a* of the eighth layer 408.

The fourth sub-line 34 includes a first line part 34*d*, a second line part 34*e*, and a third line part 34*f*. The first line part 34*d* extends in a straight line along the second direction A2. The second line part 34*e* extends in a straight line from an end of the first line part 34*d* on the third side in the second direction A2 toward the second side in the first direction A1. The third line part 34*f* extends in a straight line from an end of the first line part 34*d* on the fourth side in the second direction A2 toward the second side in the first direction A1. The first end 34*a* of the fourth sub-line 34 is an end of the second line part 34*e* on the fourth side in the second direction A2. The second end 34*b* of the fourth sub-line 34 is an end of the third line part 34*f* on the fourth side in the second direction A2.

At the ninth layer 409, the first end 34*a* and the second end 34*b* of the fourth sub-line 34 are connected to the determined terminals 44*a* and 44*a* with wiring paths such as the via conductors B1 interposed therebetween.

3 Arrangement Relationship Among Main Line and First to Fourth Sub-Lines

In the second embodiment, the main line 2 includes a coil 46, a first arm part 47, and a second arm part 48. The coil 46 is formed of the ring-opened parts 2*f*, 2*k*, 2*r*, and 2*y* of the first to fourth parts 2*s*, 2*t*, 2*u*, and 2*v*. The first arm part 47 is formed of the extension part 2*e* of the first part 2*s* and the extension part 2*j* of the second part 2*t*. The second arm part 48 is formed of the extension part 2*n* of the third part 2*u* and the extension part 2*x* of the fourth part 2*v*.

Figure 16:
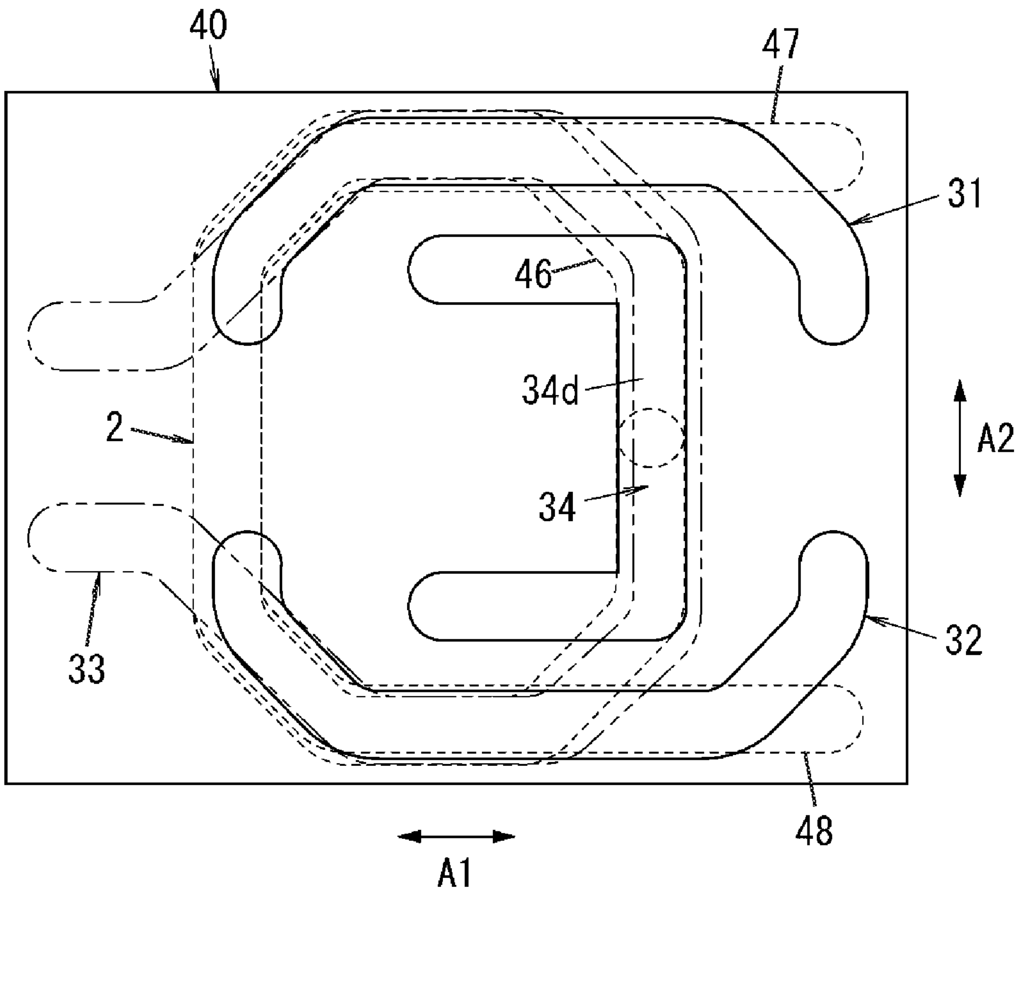
FIG. 16 is a plan view illustrating the state in which the second to eighth layers of the mounting substrate are stacked.

The fourth sub-line 34 is disposed closer to the IC chip 41 than the main line 2 is (see FIG. 10). The fourth sub-line 34 and the main line 2 partially overlap in plan view from the thickness direction D1 of the mounting substrate 40 (see FIG. 16). More particularly, the first line part 34*d* of the fourth sub-line 34 and a part of the coil 46 of the main line 2 on the first side in the first direction A1 overlap. Due to this overlapping, the fourth sub-line 34 and the main line 2 are electromagnetically coupled to each other.

The first sub-line 31 and the second sub-line 32 are disposed closer to the IC chip 41 than the main line 2 is (see FIG. 10). The first sub-line 31 and the main line 2 partially overlap in plan view from the thickness direction D1 of the mounting substrate 40 (see FIG. 16). More particularly, the first sub-line 31 overlaps with a part of the coil 46 of the main line 2 on the first side in the first direction A1 and the first arm part 47. Due to this overlapping, the first sub-line 31, the second sub-line 32, and the main line 2 are electromagnetically coupled to one another.

The fourth sub-line 34 is disposed between the first sub-line 31 and the second sub-line 32 in plan view from the thickness direction D1 of the mounting substrate 40. Thus, the fourth sub-line 34, the first sub-line 31, and the second sub-line 32 do not overlap in plan view from the thickness direction D1 of the mounting substrate 40. Accordingly, the electromagnetic coupling among the fourth sub-line 34, the first sub-line 31, and the second sub-line 32 is suppressed. Furthermore, as described above, since the fourth sub-line 34 is disposed between the first sub-line 31 and the second sub-line 32, the size of the directional coupler 1 is reduced.

The third sub-line 33 is disposed farther away from the IC chip 41 than the main line 2 is (see FIG. 10). The third sub-line 33 and the coil 46 of the main line 2 overlap in plan view from the thickness direction D1 of the mounting substrate 40. Due to this overlapping, the third sub-line 33 and the main line 2 are electromagnetically coupled to each other.

The main line 2 (that is, the first to fourth parts 2*s*, 2*t*, 2*u*, and 2*v*) is disposed between the first sub-line 31 and the second sub-line 32, and the third sub-line 33. That is, the layers at which the main line 2 is formed (third to sixth layers 403 to 406) are arranged between the seventh layer 407 at which the first sub-line 31 and the second sub-line 32 are formed and the second layer 402 at which the third sub-line 33 is formed. Thus, due to the sub-line 3, the electromagnetic coupling between the first sub-line 31, the second sub-line 32, and the third sub-line is suppressed.

The main line 2 may be disposed between two sub-lines that are adjacent to each other in the thickness direction D1, among the first sub-line 31, the second sub-line 32, the third sub-line 33, and the fourth sub-line 34. That is, the layers (third to sixth layers 403 to 406) at which the main line 2 is formed may be arranged between two adjacent layers among the layers (second layer 402, seventh layer 407, and eighth layer 408) at which the first to fourth sub-lines 31 to 34 are formed. Thus, due to the main line 2, the electromagnetic coupling between the two sub-lines that are adjacent to each other in the thickness direction D1 can be suppressed.

In the second embodiment, the main line 2 and the first to fourth sub-lines 31 to 34 are disposed at different layers among the plurality of layers 401 to 409 of the mounting substrate 40. The main line 2 and the first to fourth sub-lines 31 to 34 are disposed in such a manner that the first to fourth sub-lines 31 to 34 do not overlap but the main line 2 and the first to fourth sub-lines 31 to 34 overlap in plan view from the thickness direction D1 of the mounting substrate 40. In this case, since the first sub-line 31, the second sub-line 32, and the third sub-line 33 overlap with the main line 2 interposed therebetween in plan view from the thickness direction D1 of the mounting substrate 40, the electromagnetic coupling between the first sub-line 31, second sub-line 32, and the third sub-line 33 is suppressed.

Figure 17:
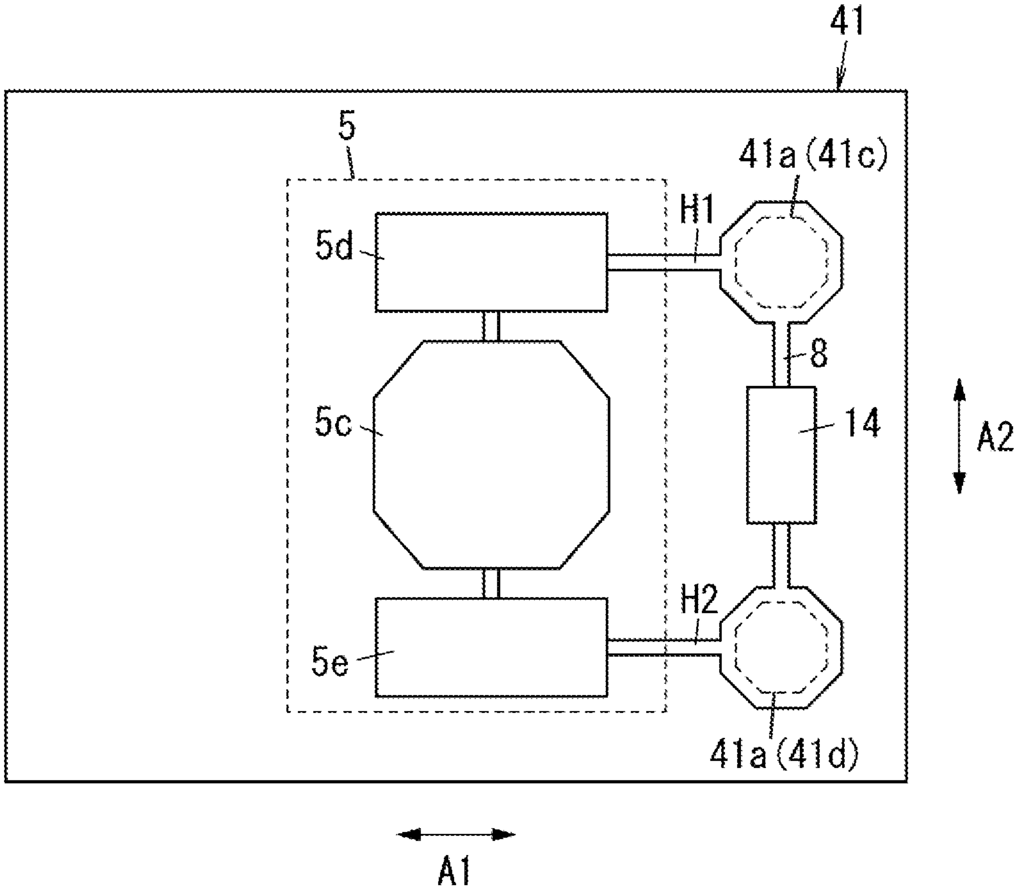

4 Example of Arrangement of First Short-Circuit Path and First Short-Circuit Switch Inside IC Chip As illustrated in FIG. 17, the external terminals 41*c* and 41*d* are disposed on the rear surface of the IC chip 41. Furthermore, the phase shift circuit 5, the first short-circuit path 8, and the first short-circuit switch 14 are provided inside the IC chip 41.

The phase shift circuit 5 includes the inductor 5*c* and the two capacitors 5*d* and 5*e*. The two capacitors 5*d* and 5*e* are, for example, disposed on sides of the inductor 5*c* in the second direction A2. One end of the capacitor 5*d* is connected to the external terminal 41*c* via a wiring path H1, and one end of the capacitor 5*e* is connected to the external terminal 41*d* via a wiring path H2. The external terminal 41*c* is connected to the terminal 44*c* of the mounting substrate 40 by soldering. The terminal 44*c* is connected to the second end 31*b* of the first sub-line 31 with a via conductor or other elements inside the mounting substrate 40 interposed therebetween. The external terminal 41*d* is connected to the terminal 44*d* of the mounting substrate 40 by soldering. The terminal 44*d* is connected to the first end 32*a* of the second sub-line 32 with a via conductor or other elements inside the mounting substrate 40 interposed therebetween. Thus, the phase shift circuit 5 is connected between the second end 31*b* of the first sub-line 31 and the first end 32*a* of the second sub-line 32.

Both ends of the first short-circuit path 8 are connected to the external terminals 41*c* and 41*d*. Thus, the first short-circuit path 8 is arranged to short-circuit the phase shift circuit 5. The first short-circuit switch 14 is provided at the first short-circuit path 8 so as to be capable of switching between conduction and non-conduction of the first short-circuit path 8. With conduction of the first short-circuit switch 14, the short circuit of the first short-circuit path 8 is enabled. Thus, as described above in the first embodiment, the inductor component of the first short-circuit path 8 is connected in parallel with the inductor 5*c* of the phase shift circuit 5. Furthermore, with non-conduction of the first short-circuit switch 14, the short circuit of the first short-circuit path 8 is disabled. Thus, the inductor component of the first short-circuit path 8 is not connected in parallel with the inductor 5*c* of the phase shift circuit 5.

5 Modifications

Modifications of the second embodiment will be described.

5-1 First Modification

Although the case where the directional coupler 1 includes a set of the main line 2 and the first to fourth sub-lines 31 to 34 is described as an example in the second embodiment, the directional coupler 1 may include a plurality of (for example, two) sets of the main line 2 and the first to fourth sub-lines 31 to 34.

Third Embodiment

The directional coupler 1 according to a third embodiment will be described with reference to FIG. 18.

Although the case where the directional coupler 1 includes the four sub-lines (first to fourth sub-lines 31 to 34) is described as an example in the first embodiment, a case where the directional coupler 1 includes three sub-lines (first to third sub-lines 531 to 533) will be described as an example in the third embodiment.

1 Configuration

Figure 18:
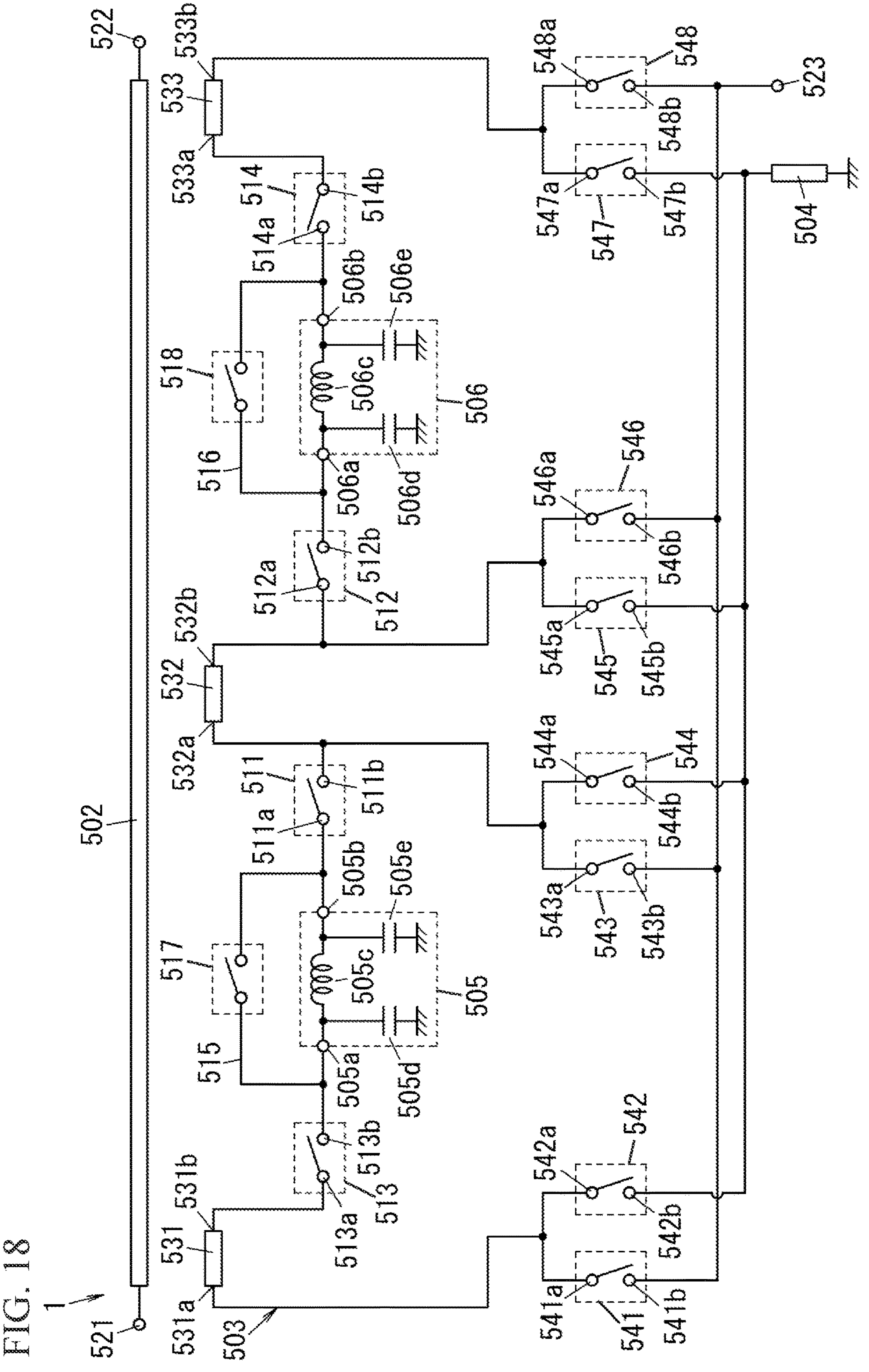
FIG. 18 is a circuit diagram of a directional coupler according to a third embodiment.

As illustrated in FIG. 18, the directional coupler 1 according to the third embodiment includes a main line 502, a sub-line 503, a termination circuit 504, a first phase shift circuit 505, a second phase shift circuit 506, first to fourth selector switches 511 to 514, a first short-circuit path 515, a second short-circuit path 516, a first short-circuit switch 517, and a second short-circuit switch 518. The directional coupler 1 also includes first to third connection terminals 521 to 523 and first to eighth switches 541 to 548.

Since the first to third connection terminals 521 to 523 are the same as the first to third connection terminals 11 to 13 according to the first embodiment, the detailed description of the first to third connection terminals 521 to 523 will be omitted. Since the main line 502 is the same as the main line 502 in the first embodiment, the detailed description of the main line 502 will be omitted.

The sub-line 503 includes a first sub-line 531, a second sub-line 532, and a third sub-line 533.

The first sub-line 531 has a first end 531*a* and a second end 31*b*, which are both ends of the first sub-line 531 in the longitudinal direction. The first end 531*a* of the first sub-line 531 is connected to a first terminal 541*a*, which will be described later, of the first switch 541. The second end 531*b* of the first sub-line 531 is connected to a terminal 513*a*, which will be described later, of the third selector switch 513. The first sub-line 531 is electromagnetically coupled to the main line 502.

The second sub-line 532 has a first end 532*a* and a second end 532*b*, which are both ends of the second sub-line 532 in the longitudinal direction. The first end 532*a* of the second sub-line 532 is connected to a terminal 511*b*, which will be described later, of the first selector switch 511. The second end 532*b* of the second sub-line 532 is connected to a terminal 512*a*, which will be described later, of the second selector switch 512. The second sub-line 532 is electromagnetically coupled to the main line 502.

The third sub-line 533 has a first end 533*a* and a second end 533*b*, which are both ends of the third sub-line 533 in the longitudinal direction. The first end 533*a* of the third sub-line 533 is connected to a terminal 514*b*, which will be described later, of the fourth selector switch 514. The second end 533*b* of the third sub-line 533 is connected to a first terminal 548*a*, which will be described later, of the eighth switch 548. The third sub-line 533 is electromagnetically coupled to the main line 502.

The directional coupler 1 according to the third embodiment includes three modes (first to third modes). In the first mode, a series circuit in which the first sub-line 531, the first phase shift circuit 505, the second sub-line 532, the second phase shift circuit 506, and the third sub-line 533 are connected in series in this arrangement is used as the sub-line 503. In the second mode, a series circuit in which the first sub-line 531, the first phase shift circuit 505, and the second sub-line 532 are connected in series in this arrangement is used as the sub-line 503. In the third mode, the second sub-line 532 is used as the sub-line 503.

The termination circuit 504 is a circuit for terminating one of the both ends of the sub-line 503 used in each of the three modes.

The first phase shift circuit 505 has a first end 505*a* and a second end 505*b*. The first end 505*a* of the first phase shift circuit 505 is connected to a terminal 513*b*, which will be described later, of the third selector switch 513. The second end 505*b* of the first phase shift circuit 505 is connected to a terminal 511*a*, which will be described later, of the first selector switch 511. The first phase shift circuit 505 has, for example, the same configuration as that of the phase shift circuit 5 in the first embodiment, and includes an inductor 505*c* and two capacitors 505*d* and 505*e*. The inductor 505*c* is connected between both ends (first end 505*a* and second end 505*b*) of the first phase shift circuit 505. The capacitor 505*d* is connected between a connection point between the first end 505*a* of the first phase shift circuit 505 and the inductor 505*c* and the ground. The capacitor 505*e* is connected between a connection point between the second end 505*b* of the first phase shift circuit 505 and the inductor 505*c* and the ground.

The second phase shift circuit 506 has a first end 506*a* and a second end 506*b*. The first end 506*a* of the second phase shift circuit 506 is connected to a terminal 512*b*, which will be described later, of the second selector switch 512. The second end 506*b* of the second phase shift circuit 506 is connected to a terminal 514*a*, which will be described later, of the fourth selector switch 514. The second phase shift circuit 506 has, for example, the same configuration as that of the phase shift circuit 5 in the first embodiment, and includes an inductor 506*c* and two capacitors 506*d* and 506*e*. The inductor 506*c* is connected between both ends (first end 506*a* and second end 506*b*) of the second phase shift circuit 506. The capacitor 506*d* is connected between a connection point between the first end 506*a* of the second phase shift circuit 506 and the inductor 506*c* and the ground. The capacitor 506*e* is connected between a connection point between the second end 506*b* of the second phase shift circuit 506 and the inductor 506*c* and the ground.

The first selector switch 511 is provided between the second end 505*b* of the first phase shift circuit 505 and the first end 532*a* of the second sub-line 532 and switches between connection and disconnection between the second end 505*b* of the first phase shift circuit 505 and the first end 532*a* of the second sub-line 532. The first selector switch 511 includes the two terminals 511*a* and 511*b*. The two terminals 511*a* and 511*b* are capable of switching between connection and disconnection. The terminal 511*a* of the first selector switch 511 is connected to the second end 505*b* of the first phase shift circuit 505. The terminal 511*b* of the first selector switch 511 is connected to the first end 532*a* of the second sub-line 532.

The second selector switch 512 is provided between the second end 532*b* of the second sub-line 532 and the first end 506*a* of the second phase shift circuit 506 and switches between connection and disconnection between the second end 532*b* of the second sub-line 532 and the first end 506*a* of the second phase shift circuit 506. The second selector switch 512 includes the two terminals 512*a* and 512*b*. The two terminals 512*a* and 512*b* are capable of switching between connection and disconnection. The terminal 512*a* of the second selector switch 512 is connected to the second end 532*b* of the second sub-line 532. The terminal 512*b* of the second selector switch 512 is connected to the first end 506*a* of the second phase shift circuit 506.

The third selector switch 513 is provided between the first end 31*a* of the first sub-line 531 and the first end 505*a* of the first phase shift circuit 505 and switches between connection and disconnection between the first end 531*a* of the first sub-line 531 and the first end 505*a* of the first phase shift circuit 505. The third selector switch 513 includes the two terminals 513*a* and 513*b*. The two terminals 513*a* and 513*b* are capable of switching between connection and disconnection. The terminal 513*a* of the third selector switch 513 is connected to the second end 531*b* of the first sub-line 531. The terminal 513*b* of the third selector switch 513 is connected to the first end 505*a* of the first phase shift circuit 505.

The fourth selector switch 514 is provided between the second end 506*b* of the second phase shift circuit 506 and the first end 533*a* of the third sub-line 533 and switches between connection and disconnection between the second end 506*b* of the second phase shift circuit 506 and the first end 533*a* of the third sub-line 533. The fourth selector switch 514 includes the two terminals 514*a* and 514*b*. The two terminals 514*a* and 514*b* are capable of switching between connection and disconnection. The terminal 514*a* of the fourth selector switch 514 is connected to the second end 506*b* of the second phase shift circuit 506. The terminal 514*b* of the fourth selector switch 514 is connected to the first end 533*a* of the third sub-line 533.

The first short-circuit path 515 is a wiring path that short-circuits between both ends (first end 505*a* and second end 505*b*) of the first phase shift circuit 505.

The second short-circuit path 516 is a wiring path that short-circuits between both ends (first end 506*a* and second end 506*b*) of the second phase shift circuit 506.

The first short-circuit switch 517 makes the first short-circuit path 515 conductive and non-conductive. By making the first short-circuit path 515 non-conductive, the first short-circuit switch 517 disables the first short-circuit path 515. Furthermore, by making the first short-circuit path 515 conductive, the first short-circuit switch 517 connects an inductor component of the first short-circuit path 515 in parallel with the inductor 505*c* of the first phase shift circuit 505. Thus, as in the first embodiment, a situation in which the resonant frequency of a resonance circuit (a resonance circuit including the inductor 505*c* of the first phase shift circuit 505 and a parasitic capacitance formed between the main line 502, the first sub-line 531, and the second sub-line 532) of the directional coupler 1 causes the loss in signals flowing in the main line 502 can be suppressed.

The second short-circuit switch 518 makes the second short-circuit path 516 conductive and non-conductive. By making the second short-circuit path 516 non-conductive, the second short-circuit switch 518 disables the second short-circuit path 516. Furthermore, by making the second short-circuit path 516 conductive, the second short-circuit switch 518 connects an inductor component of the second short-circuit path 516 in parallel with the inductor 506*c* of the second phase shift circuit 506. Thus, as in the first embodiment, a situation in which the resonant frequency of a resonance circuit (a resonance circuit including the inductor 506*c* of the second phase shift circuit 506 and a parasitic capacitance formed between the main line 502, the second sub-line 532, and the third sub-line 533) of the directional coupler 1 causes the loss in signals flowing in the main line 502 can be suppressed.

The first to eighth switches 541 to 548 are switches for connecting one end of the sub-line 503 used in each of the three modes to the first connection terminal 521 and connecting the other end of the sub-line 503 to the termination circuit 504.

The first to eighth switches 541 to 548 each include two terminals (first terminal and second terminal) capable of switching between connection and disconnection. The first terminal 541*a* of the first switch 541 and a first terminal 542*a* of the second switch 542 are connected to the first end 31*a* of the first sub-line 531. A first terminal 543*a* of the third switch 543 and a first terminal 544*a* of the fourth switch 544 are connected to the first end 532*a* of the second sub-line 532. A first terminal 545*a* of the fifth switch 545 and a first terminal 546*a* of the sixth switch 546 are connected to the second end 532*b* of the second sub-line 532. A first terminal 547*a* of the seventh switch 547 and the first terminal 548*a* of the eighth switch 548 are connected to the second end 533*b* of the third sub-line 533. Second terminals 541*b*, 543*b*, 546*b*, and 548*b* of the first switch 541, the third switch 543, the sixth switch 546, and the eighth switch 548, respectively, are connected to the third connection terminal 523. Second terminals 542*b*, 544*b*, 545*b*, and 547*b* of the second switch 542, the fourth switch 544, the fifth switch 545, and the seventh switch 547, respectively, are connected to the termination circuit 504.

As described above, the directional coupler 1 according to the third embodiment has the first mode, the second mode, and the third mode. The first mode is a mode in which a signal of the first frequency band among high frequency signals flowing in the main line 502 is detected. The second mode is a mode in which a signal of the second frequency band among high frequency signals flowing in the main line 502 is detected. The third mode is a mode in which a signal of the third frequency band among high frequency signals flowing in the main line 502 is detected.

The first frequency band corresponds to, for example, a frequency band from 617 MHz to 960 MHz (that is, a low band (LB)). The second frequency band corresponds to, for example, a frequency band from 1.427 GHz to 2.69 GHz (that is, a middle band (MB) to a high band (HB)). The third frequency band corresponds to, for example, a frequency band from 3.3 GHz to 4.2 GHz (that is, an ultra-high band (UHB)).

2 Operation 2-1 First Mode

In the first mode, the directional coupler 1 uses the sub-line 503 including the first sub-line 531, the second sub-line 532, and the third sub-line 533, the first phase shift circuit 505, and the second phase shift circuit 506. Thus, the first to fourth selector switches 511 to 514 are made conductive, and the first short-circuit switch 517 and the second short-circuit switch 518 are made non-conductive.

With the use of the first phase shift circuit 505 and the second phase shift circuit 506, the phase of the sub-line 503 used is adjusted. Thus, the leakage of a non-detection target signal, which flows in the main line 502 concurrently with a detection target signal, into the sub-line 503 can be suppressed.

In the first mode, in the case where a forward signal flowing in the main line 2 (a signal flowing from the first connection terminal 521 to the second connection terminal 522) is detected, in the sub-line 503 used, the first switch 541 is made conductive so that the first end 531*a* of the first sub-line 531 is connected to the third connection terminal 523, and the seventh switch 547 is made conductive so that the second end 533*b* of the third sub-line 533 is connected to the termination circuit 504. The remaining switches (second to sixth switches 542 to 546 and eighth switch 548) are made non-conductive.

Furthermore, in the first mode, in the case where a backward signal flowing in the main line 2 (a signal flowing from the second connection terminal 522 to the first connection terminal 521) is detected, in the sub-line 503 used, the second switch 542 is made conductive so that the first end 531*a* of the first sub-line 531 is connected to the termination circuit 504, and the eighth switch 548 is made conductive so that the second end 533*b* of the third sub-line 533 is connected to the third connection terminal 523. The remaining switches (first switch 21 and third to seventh switches 23 to 27) are made non-conductive.

2-2 Second Mode

In the second mode, the directional coupler 1 uses the sub-line 503 including the first sub-line 531 and the second sub-line 532, and the first phase shift circuit 505. Thus, the first selector switch 511 and the third selector switch 513 are made conductive, and the first short-circuit switch 517 is made non-conductive. Furthermore, the second selector switch 512 and the fourth selector switch 514 are made non-conductive, and the second short-circuit switch 518 is made conductive.

With the use of the first phase shift circuit 505, the phase of the sub-line 503 used is adjusted. Thus, the leakage of a non-detection target signal, which flows in the main line 502 concurrently with a detection target signal, into the sub-line 503 can be suppressed.

Furthermore, as described above, by making the second short-circuit switch 518 conductive, the inductor component of the second short-circuit path 516 is connected in parallel with the inductor 506*c* of the second phase shift circuit 506 that is not used. Thus, as in the first embodiment, the resonant frequency of the resonance circuit of the directional coupler 1 is higher than the frequency band of a signal flowing in the main line 502, and a situation in which the resonant frequency of the resonance circuit causes the loss in signals flowing in the main line 502 can be suppressed. The resonance circuit includes a composite inductor of the second phase shift circuit 506 and the second short-circuit path 516 that are connected in parallel, and a parasitic capacitance formed between the main line 502 and the third sub-line 533.

In the second mode, in the case where a forward signal flowing in the main line 502 (a signal flowing from the first connection terminal 521 to the second connection terminal 522) is detected, in the sub-line 503 used, the first switch 541 is made conductive so that the first end 531*a* of the first sub-line 531 is connected to the third connection terminal 523, and the fifth switch 545 is made conductive so that the second end 532*b* of the second sub-line 532 is connected to the termination circuit 504. The remaining switches (second to fourth switches 542 to 544 and sixth to eighth switches 546 to 548) are made non-conductive.

Furthermore, in the second mode, in the case where a backward signal flowing in the main line 502 (a signal flowing from the second connection terminal 522 to the first connection terminal 521) is detected, in the sub-line 503 used, the second switch 542 is made conductive so that the first end 531*a* of the first sub-line 531 is connected to the termination circuit 504, and the sixth switch 546 is made conductive so that the second end 532*b* of the second sub-line 532 is connected to the third connection terminal 523. The remaining switches (first switch 541, third to fifth switches 543 to 545, seventh switch 547, and eighth switch 548) are made non-conductive.

In the second mode, the directional coupler 1 uses, as the sub-line 3, a series circuit in which the first sub-line 531, the first phase shift circuit 505, and the second sub-line 532 are connected in series in this arrangement. However, in the second mode, the directional coupler 1 may use, instead of the series circuit mentioned above, a series circuit in which the second sub-line 532, the second phase shift circuit 506, and the third sub-line 533 are connected in series in this arrangement, as the sub-line 503. In this case, the first short-circuit switch 517 is made conductive so that the inductor component of the first short-circuit path 515 is connected in parallel with the inductor 505*c* of the first phase shift circuit 505 that is not used.

2-3 Third Mode

In the third mode, the directional coupler 1 uses the sub-line 503 including the second sub-line 532. Thus, the first to fourth selector switches 511 to 514 are made non-conductive, and the first short-circuit switch 517 and the second short-circuit switch 518 are made conductive.

By making the first short-circuit switch 517 and the second short-circuit switch 518 conductive, the inductor component of the first short-circuit path 515 is connected in parallel with the inductor 505*c* of the first phase shift circuit 505 that is not used, and the inductor component of the second short-circuit path 516 is connected in parallel with the inductor 506*c* of the second phase shift circuit 506 that is not used. Thus, as in the first embodiment, the resonant frequency of the resonance circuit of the directional coupler 1 is higher than the frequency band of a signal flowing in the main line 502, and the situation in which the resonant frequency of the resonance circuit causes the loss in signals flowing in the main line 502 can be suppressed. The resonance circuit includes a parasitic capacitance between the main line 502, the first sub-line 531, and the third sub-line 533, a composite inductor of the first phase shift circuit 505 and the first short-circuit path 515 that are connected in parallel, and a composite inductor of the second phase shift circuit 506 and the second short-circuit path 516 that are connected in parallel.

In the third mode, in the case where a forward signal flowing in the main line 502 (a signal flowing from the first connection terminal 521 to the second connection terminal 522) is detected, in the sub-line 503 used, the third switch 543 is made conductive so that the first end 532*a* of the second sub-line 532 is connected to the third connection terminal 523, and the fifth switch 545 is made conductive so that the second end 532*b* of the second sub-line 532 is connected to the termination circuit 504. The remaining switches (first switch 541, second switch 542, fourth switch 544, and sixth to eighth switches 546 to 548) are made non-conductive.

Furthermore, in the third mode, in the case where a backward signal flowing in the main line 502 (a signal flowing from the second connection terminal 522 to the first connection terminal 521) is detected, in the sub-line 503 used, the fourth switch 544 is made conductive so that the first end 532*a* of the second sub-line 532 is connected to the termination circuit 504, and the sixth switch 546 is made conductive so that the second end 532*b* of the second sub-line 532 is connected to the third connection terminal 523. The remaining switches (first to third switches 541 to 543, fifth switch 545, seventh switch 547, and eighth switch 548) are made non-conductive.

3 Modifications

Modifications of the third embodiment will be described with reference to FIG. 19.

3-1 First Modification

Figure 19:
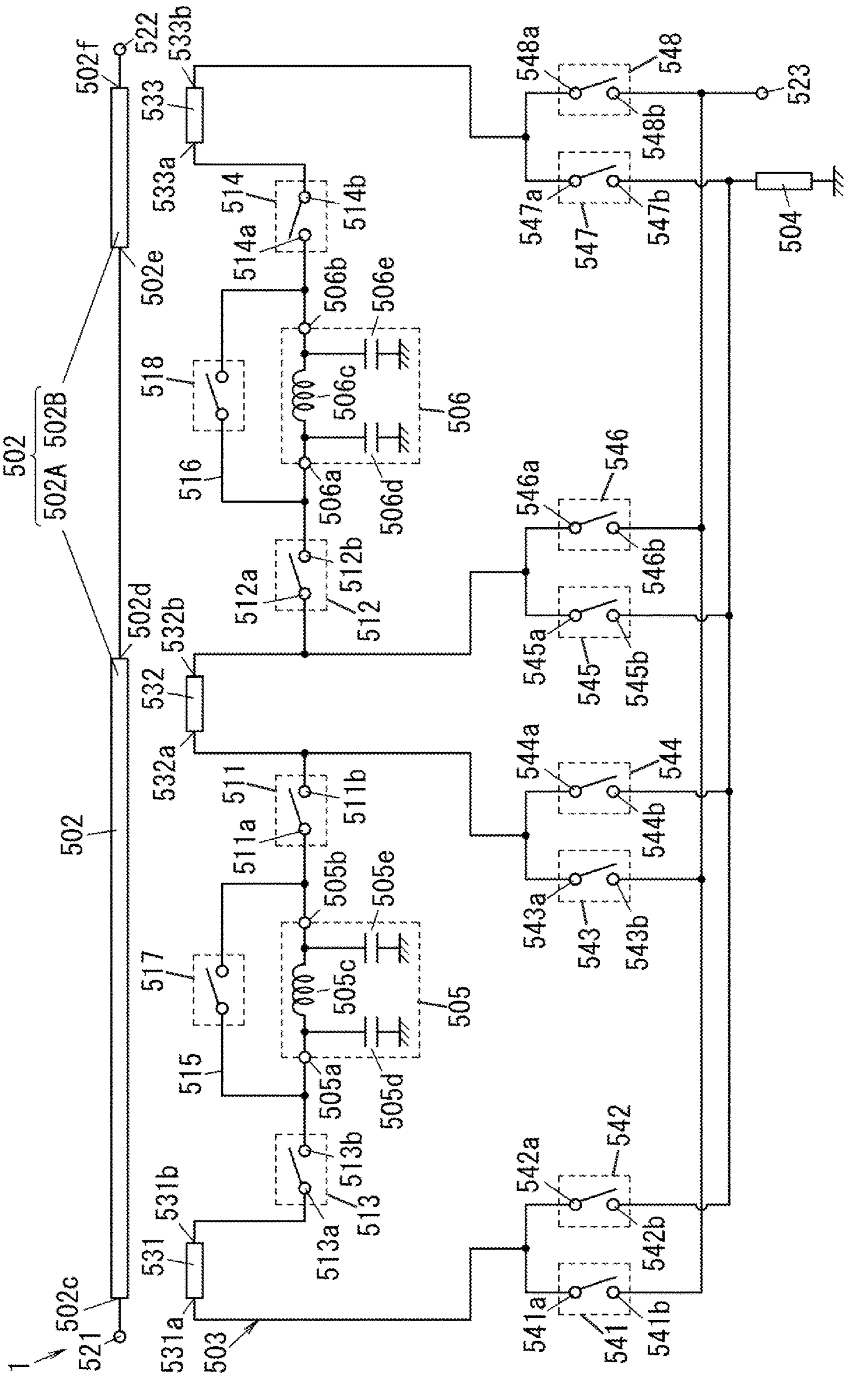
FIG. 19 is a circuit diagram of a directional coupler according to a first modification of the third embodiment.

As illustrated in FIG. 19, in a first modification of the third embodiment, the main line 502 includes a first main line 502A and a second main line 502B.

The first main line 502A and the second main line 502B are connected in series. More particularly, the first main line 502A has a first end 502*c* and a second end 502*d*. The second main line 502B has a first end 502*e* and a second end 502*f*. The first end 502*c* of the first main line 502A is connected to the first connection terminal 521. The second end 502*d* of the first main line 502A is connected to the first end 502*e* of the second main line 502B via a wiring path. The second end 502*f* of the second main line 502B is connected to the second connection terminal 522. The first sub-line 531 and the second sub-line 532 are, for example, electromagnetically coupled to the first main line 502A. The third sub-line 533 is, for example, arranged and electromagnetically coupled to the second main line 502B.

According to the first modification, the flexibility of the adjustment of the degree of coupling between the main line 2 and the first to third sub-lines 33 to 33 can be improved.

3-2 Second Modification

In the third embodiment, the third selector switch 513 may be omitted. In this case, the first end 505*a* of the first phase shift circuit 505 is connected to the second end 531*b* of the first sub-line 531. Furthermore, the fourth selector switch 514 may be omitted. In this case, the second end 506*b* of the second phase shift circuit 506 is connected to the first end 533*a* of the third sub-line 533.

Fourth Embodiment

Figure 20:
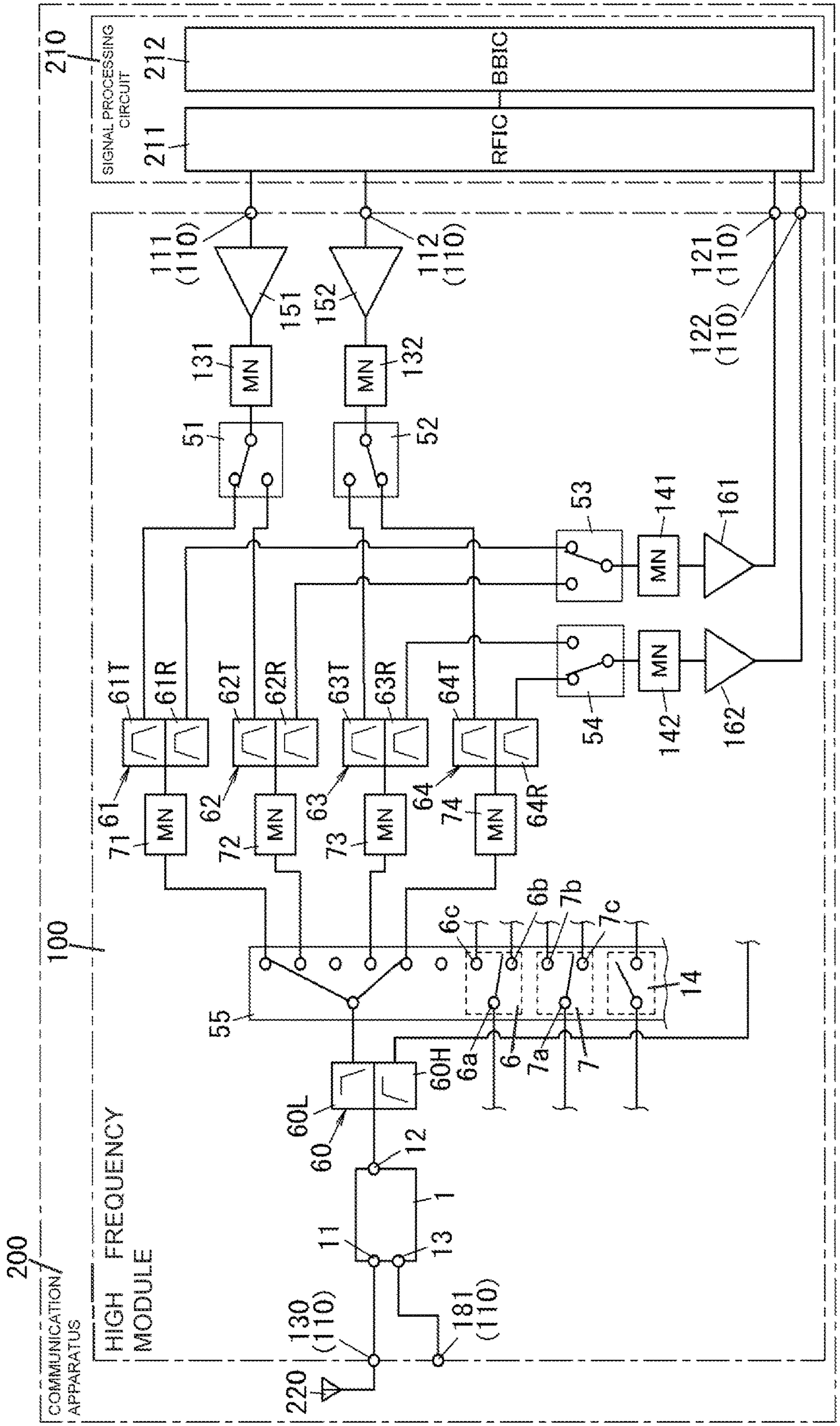
FIG. 20 is a configuration diagram illustrating an example of a communication apparatus according to a fourth embodiment.

A high frequency module 100 and a communication apparatus 200 according to a fourth embodiment will be described with reference to FIG. 20. The high frequency module 100 according to the fourth embodiment is an example of a high frequency module including the directional coupler 1 according to the first embodiment. The communication apparatus 200 according to the fourth embodiment is an example of the communication apparatus 200 including the high frequency module 100.

1 Configuration of Communication Apparatus

The communication apparatus 200 is, for example, a portable terminal (for example, a smartphone) or a wearable terminal (for example, a smartwatch). The communication apparatus 200 includes the high frequency module 100, a signal processing circuit 210, and an antenna 220.

The high frequency module 100 is configured to extract a reception signal of a predetermined frequency band from reception signals received at the antenna 220, amplify the reception signal, and outputs the amplified reception signal to the signal processing circuit 210. The high frequency module 100 is also configured to amplify and convert a transmission signal outputted from the signal processing circuit 210 into a transmission signal of a predetermined frequency band and output the converted transmission signal from the antenna 220.

The signal processing circuit 210 is connected to the high frequency module 100 and is configured to perform signal processing for a high frequency signal. More particularly, the signal processing circuit 210 performs signal processing for a reception signal outputted from the high frequency module 100 and performs signal processing for a transmission signal to be outputted to the high frequency module 100. The signal processing circuit 210 includes an RF signal processing circuit 211 and a baseband signal processing circuit 212. The RF signal processing circuit 211 is, for example, a radio frequency integrated circuit (RFIC). The baseband signal processing circuit 212 is, for example, a baseband integrated circuit (BBIC).

2 Configuration of High Frequency Module

The high frequency module 100 includes a plurality of external connection terminals 110, power amplifiers 151 and 152, low noise amplifiers 161 and 162, transmission filters 61T to 64T, reception filters 61R to 64R, output matching circuits 131 and 132, matching circuits 141 and 142, matching circuits 71 to 74, switches 51 to 55, a diplexer 60, and the directional coupler 1 (coupler). A transmission filter and a reception filter may be integrated together as a duplexer. Acoustic wave filters such as surface acoustic wave (SAW) or bulk acoustic wave (BAW) may be used as a transmission filter and a reception filter.

The plurality of external connection terminals 110 include an antenna terminal 130, two signal input terminals 111 and 112, two signal output terminals 121 and 122, and a coupler output terminal 181. The coupler output terminal 181 is a terminal that outputs a detection signal extracted by the directional coupler 1 to the outside (for example, the signal processing circuit 210).

The diplexer 60 includes a first filter 60L and a second filter 60H and may include passive elements such as an inductor (L) and a capacitor (C).

The directional coupler 1 is configured as with the directional coupler 1 according to the first embodiment. The directional coupler 1 extracts, as a detection signal, part of high frequency signals (reception signals or transmission signals) flowing in a section (main line 2) of a signal path between the antenna terminal 130 and a first input/output part of the diplexer 60, from the sub-line 3 that is electromagnetically coupled to the main line 2. Then, the directional coupler 1 outputs the extracted detection signal to the outside (for example, the signal processing circuit 210) of the high frequency module 100 through the coupler output terminal 181.

The directional coupler 1 according to this embodiment includes, as with the directional coupler 1 according to the first embodiment, the main line 2, the first to fourth sub-lines 31 to 34, the termination circuit 4, the phase shift circuit 5, the first selector switch 6, the second selector switch 7, the first short-circuit switch 14, the second short-circuit switch 15, the first to eighth switches 21 to 28, and the first to third connection terminals 11 to 13.

The first selector switch 6, the second selector switch 7, the first short-circuit switch 14, the second short-circuit switch 15, and the first to eighth switches 21 to 28 are provided inside the switch 55 and configured to be integrated with the switch 55. The first connection terminal 11 is connected to the antenna terminal 130, and the second connection terminal 12 is connected to the first input/output part of the diplexer 60. That is, the main line 2 of the directional coupler 1 configures a section of the signal path between the antenna terminal 130 and the diplexer 60. The third connection terminal 13 is connected to the coupler output terminal 181.

According to this embodiment, since the first selector switch 6, the second selector switch 7, the first short-circuit switch 14, the second short-circuit switch 15, and the first to eighth switches 21 to 28 of the directional coupler 1 are integrated with the switch 55 (antenna switch), the size of the high frequency module 100 can be reduced.

The first to fourth embodiments and the modifications of the first to fourth embodiments described above may be combined and implemented.

Aspects

Aspects described below are disclosed based on the embodiments and the modifications described above.

According to a first aspect, a directional coupler (1) includes: a main line (2; 502); a first sub-line (31; 531); a second sub-line (32; 531); a first phase shift circuit (5; 505); a first short-circuit path (8; 515); and a first short-circuit switch (14; 517). The first phase shift circuit (5; 505) is connected between the first sub-line (31; 531) and the second sub-line (32; 532). The first short-circuit path (8; 515) short-circuits both ends of the first phase shift circuit (5; 505). The first short-circuit switch (14; 517) switches between conduction and non-conduction of the first short-circuit path (8; 515).

With this arrangement, the first phase shift circuit (5; 505) is connected between the first sub-line (31; 531) and the second sub-line (32; 532). Thus, when the second signal, out of the first signal and the second signal of different frequency bands that flow at the same time in the main line (2; 502) by making the first short-circuit switch (14; 517) non-conductive and using the sub-line (3; 503) including the first sub-line (31; 531) and the second sub-line (32; 532) and the first phase shift circuit (5; 505) is detected, the leakage of the first signal, which is a non-detection target signal, into the sub-line (3; 503) can be suppressed by the first phase shift circuit (5; 505).

Furthermore, in the case where the first phase shift circuit (5; 505) is not used, due to the resonant frequency of a resonance circuit formed of an inductor of the first phase shift circuit (5; 505) and a parasitic capacitance between the sub-line (3; 505) and the main line (2; 502), loss may occur in signals flowing in the main line (2; 502). However, in the disclosure of this application, in the case where the first phase shift circuit (5; 505) is not used, by switching the first short-circuit switch (14; 517) to be conductive, an inductor component of the first short-circuit path (8) can be connected in parallel with the inductor of the first phase shift circuit (5; 505). Thus, the inductance of the entire inductor of the resonance circuit can be reduced. Accordingly, the resonant frequency of the resonance circuit can be higher than the frequency band of a signal flowing in the main line (2). As a result, in the case where the first phase shift circuit (5; 505) is not used, by making the first short-circuit path (8; 515) conductive, a situation in which the resonant frequency of the resonance circuit causes the loss in signals flowing in the main line (2; 502) can be suppressed.

Thus, the loss in signals flowing in the main line (2; 502) can be reduced, and in the case where a signal (detection target signal) flowing in the main line (2; 502) is detected, the leakage of a non-detection target signal, which flows in the main line (2; 503) concurrently with a detection target signal, into the sub-line (3; 503) can be suppressed.

According to a second aspect, in the directional coupler (1) according to the first aspect, an inductance of the first short-circuit path (8) is smaller than an inductance of the first phase shift circuit (5).

Thus, when the first short-circuit switch (14) is made conductive, the inductance of a composite inductor of the first phase shift circuit (5) and the first short-circuit path (8) that are connected in parallel can further be reduced. Therefore, the entire inductance of the resonance circuit described above can further be reduced.

According to a third aspect, in the directional coupler (1) according to the first or second aspect, the first phase shift circuit (5; 505) includes a low pass filter.

With this arrangement, the leakage of a non-detection target signal of a relatively high frequency band into the sub-line (3; 503) that is used can be suppressed.

According to a fourth aspect, in the directional coupler (1) according to any one of the first to third aspects, the first phase shift circuit (5; 505) includes a circuit component whose characteristic value is variable.

With this arrangement, by adjusting the characteristic value of the circuit component, the frequency characteristics regarding the degree of coupling between the sub-line (3; 503) and the main line (2; 502) can be finely adjusted.

According to a fifth aspect, in the directional coupler (1) according to any one of the first to fourth aspects, the main line (502) includes a first main line (502A) and a second main line (502B) that are connected in series.

With this arrangement, the flexibility of the adjustment of the degree of coupling between the main line (502), the first sub-line (531), and the second sub-line (532) can be improved.

According to a sixth aspect, the directional coupler (1) according to any one of the first to fifth aspects includes four sub-lines including the first sub-line (31) and the second sub-line (32). Out of the four sub-lines, at least the first sub-line (31) and the second sub-line (32) have the same line length (M1, M2).

With this arrangement, in the case where the directional coupler (1) includes four sub-lines (31 to 34), line lengths (M1 and M2) of the two sub-lines (first sub-line (31) and second sub-line (32)) at both ends of the first phase shift circuit (5) can be the same. Thus, variations in the characteristics regarding the directivity of the directional coupler (1) between the case where the characteristics are seen from the point of view of a signal flowing in the main line (2) in a forward direction (forward signal) and the case where the characteristics are seen from the point of view of a signal flowing in the main line (2) in a backward direction (backward signal) can be suppressed.

According to a seventh aspect, in the directional coupler (1) according to the sixth aspect, the four sub-lines (31 to 34) include a third sub-line (33) and a fourth sub-line (34). The directional coupler (1) further includes: a first selector switch (6) and a second selector switch (7). The first selector switch (6) switches between conduction and non-conduction between the third sub-line (33) and the first sub-line (31). The second selector switch (7) switches between conduction and non-conduction between the fourth sub-line (34) and the second sub-line (32).

With this arrangement, in the case where the four sub-lines (31 to 34) are provided, the first phase shift circuit (5) is connected between the center two sub-lines (first sub-line (31) and second sub-line (32)). Thus, the arrangement of the first phase shift circuit (5) among the four sub-lines can be the same between the case where the arrangement is seen from the point of view of a signal flowing in the main line (2) in the forward direction (forward signal) and the case where the arrangement is seen from the point of view of a signal flowing in the main line (2) in the backward direction (backward signal). Therefore, in the case where the directional coupler (1) has bidirectional characteristics, variations in the characteristics regarding the directivity between the case where a forward signal is detected and the case where a backward signal is detected can further be reduced.

According to an eighth aspect, in the directional coupler (1) according to the seventh aspect, in at least one of the first sub-line (31), the second sub-line (32), the third sub-line (33), and the fourth sub-line (34), the directional coupler (1) further includes a second short-circuit path (9) and a second short-circuit switch (15). The second short-circuit path (9) short-circuits both ends of the at least one sub-line. The second short-circuit switch (15) switches between conduction and non-conduction of the second short-circuit path (9).

With this arrangement, both ends of a sub-line that is not used for detection, among the at least one sub-line, can be short-circuited by the second short-circuit switch (15). With this short-circuiting, the frequency characteristics of a signal that can be detected can be finely adjusted in the sub-line (3) that is used for detection. Thus, the sub-lines with the same line length can be used for the detection of signals of different frequency bands according to whether or not a non-used sub-line is short-circuited.

According to a ninth aspect, the directional coupler (1) according to the seventh or eighth aspect further includes a multilayer substrate (40) including a plurality of dielectric layers (401 ton 409). The first sub-line (31) and the second sub-line (32) configure a sub-line (3) that is capable of being used to detect a signal of a middle frequency band among three different frequency bands. The third sub-line (33) configures a sub-line (3) that is capable of being used to detect a signal of the lowest frequency band among the three frequency bands. The fourth sub-line (34) configures a sub-line (3) that is capable of being used to detect a signal of the highest frequency band among the three frequency bands. The main line (2), the first sub-line (31), the second sub-line (32), the third sub-line (33), and the fourth sub-line (34) are disposed at different dielectric layers among the plurality of dielectric layers (401 to 409).

With this arrangement, since the main line (2), the first sub-line (31), the second sub-line (32), the third sub-line (33), and the fourth sub-line (34) are disposed at different dielectric layers among the plurality of dielectric layers (401 to 409), the size of the directional coupler (1) can be reduced.

According to a tenth aspect, in the directional coupler (1) according to the ninth aspect, the fourth sub-line (34) is disposed between the first sub-line (31) and the second sub-line (32) in plan view from a thickness direction (D1) of the multilayer substrate (40).

With this arrangement, the size of the directional coupler (1) can further be reduced. Furthermore, since the fourth sub-line (34), the first sub-line (31), and the second sub-line (32) do not overlap in the thickness direction (D1), the magnetic coupling between the fourth sub-line (34), the first sub-line (31), and the second sub-line (32) can be suppressed.

According to an eleventh aspect, in the directional coupler (1) according the ninth or tenth aspect, the main line (2) is disposed between two sub-lines that are adjacent to each other in a thickness direction (D1) of the multilayer substrate (40) among the first sub-line (31), the second sub-line (32), the third sub-line (33), and fourth sub-line (34) in plan view from the thickness direction (D1).

With this arrangement, the electromagnetic coupling between the two sub-lines that are adjacent to each other in the thickness direction (D1) can be suppressed by the main line (2).

According to a twelfth aspect, in the directional coupler (1) according to any one of the ninth to eleventh aspects, an IC chip (41) including the first phase shift circuit (5), the first short-circuit switch (14), the first selector switch (6), and the second selector switch (7) is disposed at the multilayer substrate (40).

With this arrangement, since the first phase shift circuit (5), the first short-circuit switch (14), the first selector switch, and the second selector switch are included in an IC chip, the main line (2) and the first to fourth sub-lines can be physically disposed away from the first phase shift circuit (5), the first short-circuit switch (14), the first selector switch, and the second selector switch. Thus, the unwanted electromagnetic coupling between the main line (2) and the first to fourth sub-lines, and the first phase shift circuit (5), the first short-circuit switch (14), the first selector switch (6), and the second selector switch (7) can be suppressed.

According to a thirteenth aspect, in the directional coupler (1) according to the twelfth aspect, the IC chip (41) and the main line (2) overlap in plan from a thickness direction (D1) of the multilayer substrate (40).

With this arrangement, the wiring path for connecting the IC chip (41) with the main line (2) can be shortened, and the generation of an unwanted inductor in the wire connecting the IC chip (41) with the main line (2) can be suppressed.

According to a fourteenth aspect, the directional coupler (1) according to any one of the first to fifth aspects includes: a third sub-line (533); a second phase shift circuit (506); a second short-circuit path (516); a second short-circuit switch (518); a first selector switch (511); and a second selector switch (512). The second phase shift circuit (506) is connected between the second sub-line (532) and the third sub-line (533). The second short-circuit path (516) short-circuits both ends of the second phase shift circuit (506). The second short-circuit switch (518) switches between conduction and non-conduction of the second short-circuit path (516). The first selector switch (511) switches between connection and disconnection between the second sub-line (32) and the first phase shift circuit (5). The second selector switch (512) switches between connection and disconnection between the second sub-line (32) and the second phase shift circuit (506).

With this arrangement, in the case where the directional coupler (1) includes three sub-lines (first to third sub-lines (531 to 533)), by switching of the first selector switch (511) and the second selector switch (512), the sub-line (503) including the first to third sub-lines (531 to 533), the first phase shift circuit (505), and the second phase shift circuit (506) may be used, the sub-line (503) including the first sub-line (531) and the second sub-line (532) and the first phase shift circuit (505) may be used, or the sub-line (503) including the second sub-line (532) may be used. By causing the short-circuit switch (517, 518) to make a short-circuit path (515, 516) for short-circuiting both ends of a non-used phase shift circuit (first phase shift circuit (505) or second phase shift circuit (506)) conductive, an inductor component of the short-circuit path can be connected in parallel with an inductor of the non-used phase shift circuit. Thus, as described above as the effects of the first aspect, the situation in which the resonance circuit described above causes the loss in signals flowing in the main line (502) can be suppressed.

According to a fifteenth aspect, a high frequency module (100) includes the directional coupler (1) according to any one of the first to fourteenth aspects; an antenna terminal (130); a plurality of filters (61T to 64T, 61R to 64R); and an antenna switch (55). The antenna switch (55) switches between connection and disconnection between a signal path reaching the antenna terminal (130) and the plurality of filters (61T to 64T, 61R to 64R). The main line (2) of the directional coupler (1) configures a section of the signal path.

With this arrangement, the high frequency module (100) including the directional coupler (1) according to the present disclosure can be provided.

According to a sixteenth aspect, in the high frequency module (100) according to the fifteenth aspect, the antenna switch (55) is integrated with the first short-circuit switch (14) of the directional coupler (1).

With this arrangement, the size of the high frequency module (100) can be reduced.

According to a seventeenth aspect, a communication apparatus (200) includes: the high frequency module (100) according to the fifteenth or sixteenth aspect; and a signal processing circuit (210). The signal processing circuit (210) is connected to the high frequency module (100) and performs signal processing for a high frequency signal.

With this arrangement, the communication apparatus (200) including the high frequency module (100) that achieves the operational effects described above can be provided.

What is claimed is:

1. A directional coupler comprising:

a main line;

a first sub-line;

a second sub-line;

a first phase shift circuit that is connected between the first sub-line and the second sub-line;

a first short-circuit path that short-circuits both ends of the first phase shift circuit; and a first short-circuit switch that is configured to selectively switch between conduction and non-conduction of the first short-circuit path, wherein the first short-circuit switch is connected in parallel with the first phase shift circuit, and wherein the main line comprises a first main line and a second main line that are connected in series.

2. The directional coupler according to claim 1, wherein an inductance of the first short-circuit path is smaller than an inductance of the first phase shift circuit.

3. The directional coupler according to claim 1, wherein the first phase shift circuit comprises a low pass filter.

4. The directional coupler according to claim 1, wherein the first phase shift circuit comprises a circuit component whose characteristic value is variable.

5. The directional coupler according to claim 1, further comprising:

a third sub-line; and a fourth sub-line, wherein at least the first sub-line and the second sub-line have a same line length.

6. The directional coupler according to claim 5, further comprising:

a first selector switch configured to selectively connect the third sub-line and the first sub-line; and a second selector switch configured to selectively connect the fourth sub-line and the second sub-line.

7. The directional coupler according to claim 6, wherein, in at least one of the sub-lines, the directional coupler further comprises:

a second short-circuit path that short-circuits both ends of the at least one sub-line; and a second short-circuit switch configured to selectively switch between conduction and non-conduction of the second short-circuit path.

8. The directional coupler according to claim 6, further comprising:

a multilayer substrate comprising a plurality of dielectric layers, wherein the first sub-line and the second sub-line are together configured to detect a signal of a middle frequency band among three different frequency bands, wherein the third sub-line is configured to detect a signal of the lowest frequency band among the three frequency bands, wherein the fourth sub-line is configured to detect a signal of the highest frequency band among the three frequency bands, and wherein the main line, the first sub-line, the second sub-line, the third sub-line, and the fourth sub-line are at different dielectric layers among the plurality of dielectric layers.

9. The directional coupler according to claim 8, wherein the fourth sub-line is at a dielectric layer between the first sub-line and the second sub-line in a plan view from a thickness direction of the multilayer substrate.

10. The directional coupler according to claim 8, wherein the main line is between two sub-lines that are adjacent to each other in a thickness direction of the multilayer substrate among the first sub-line, the second sub-line, the third sub-line, and fourth sub-line in a plan view from the thickness direction.

11. The directional coupler according to claim 8, wherein an integrated circuit (IC) chip comprises the first phase shift circuit, the first short-circuit switch, the first selector switch, and the second selector switch, and is disposed at the multilayer substrate.

12. The directional coupler according to claim 11, wherein the IC chip and the main line overlap in a plan view from a thickness direction of the multilayer substrate.

13. A directional coupler comprising:

a main line;

a first sub-line;

a second sub-line;

a first phase shift circuit that is connected between the first sub-line and the second sub-line;

a first short-circuit path that short-circuits both ends of the first phase shift circuit;

a first short-circuit switch that is configured to selectively switch between conduction and non-conduction of the first short-circuit path;

a third sub-line;

a second phase shift circuit that is connected between the second sub-line and the third sub-line;

a second short-circuit path that short-circuits both ends of the second phase shift circuit;

a second short-circuit switch configured to selectively switch between conduction and non-conduction of the second short-circuit path;

a first selector switch configured to selectively connect the second sub-line and the first phase shift circuit; and a second selector switch configured to selectively connect the second sub-line and the second phase shift circuit, wherein the first short-circuit switch is connected in parallel with the first phase shift circuit.

14. A high frequency module comprising:

a directional coupler comprising:

a main line;

a first sub-line;

a second sub-line;

a first phase shift circuit that is connected between the first sub-line and the second sub-line;

a first short-circuit path that short-circuits both ends of the first phase shift circuit; and a first short-circuit switch that is configured to selectively switch between conduction and non-conduction of the first short-circuit path;

an antenna terminal;

a plurality of filters; and an antenna switch configured to selectively connect a signal path between the antenna terminal and the plurality of filters, wherein the main line of the directional coupler is in the signal path, and wherein the first short-circuit switch is connected in parallel with the first phase shift circuit.

15. The high frequency module according to claim 14, wherein the antenna switch is integrated with the first short-circuit switch of the directional coupler.

16. A communication apparatus comprising:

the high frequency module according to claim 14; and a signal processing circuit that is connected to the high frequency module and configured to perform signal processing on a high frequency signal.

* * * * *